(12) United States Patent
Tavlarides et al.

(10) Patent No.: US 7,670,492 B2
(45) Date of Patent: Mar. 2, 2010

(54) METHOD OF REMOVING A METAL ION FROM A WATER STREAM USING ORGANO-CERAMIC COMPOSITE MATERIALS

(75) Inventors: Lawrence L. Tavlarides, Fayetteville, NY (US); Nandu V. Deorkar, Morris Plains, NJ (US); Jun-Sig Lee, Syracuse, NY (US)

(73) Assignee: Syracuse University, Syracuse, NY (US)

( * ) Notice: Subject to any disclaimer, the term of this patent is extended or adjusted under 35 U.S.C. 154(b) by 0 days.

(21) Appl. No.: 12/050,779

(22) Filed: Mar. 18, 2008

(65) Prior Publication Data

US 2008/0164215 A1 Jul. 10, 2008

Related U.S. Application Data

(62) Division of application No. 09/573,304, filed on May 18, 2000, now Pat. No. 7,358,318.

(60) Provisional application No. 60/134,828, filed on May 19, 1999.

(51) Int. Cl.
*C02F 1/28* (2006.01)
(52) U.S. Cl. .................. 210/681; 210/688; 210/912
(58) Field of Classification Search .................. 210/688, 210/912–914, 681
See application file for complete search history.

(56) References Cited

U.S. PATENT DOCUMENTS

| | | | |
|---|---|---|---|
| 4,017,528 A | 4/1977 | Unger et al. | |
| 4,836,952 A | 6/1989 | Nasu et al. | |
| 5,093,451 A | 3/1992 | Panster et al. | |
| 5,405,983 A | 4/1995 | Fost et al. | |
| 5,466,767 A | 11/1995 | Wieland et al. | |
| 5,612,275 A | 3/1997 | Tavlarides et al. | |
| 5,616,533 A | 4/1997 | Tavlarides et al. | |
| 5,624,881 A | 4/1997 | Tavlarides et al. | |
| 5,668,079 A | 9/1997 | Tavlarides et al. | |
| 5,690,832 A | 11/1997 | Tavlarides et al. | |
| 5,779,906 A | 7/1998 | Tavlarides et al. | |
| 5,814,226 A | 9/1998 | Tavlarides et al. | |
| 5,817,239 A | 10/1998 | Tavlarides et al. | |

OTHER PUBLICATIONS

Ju et al., "Synthesis and Characterization of Ordered Mesoporous Anion-Exchange Inorganic/Organic Hybrid Resins for Radionuclide Separation," Ing. Eng. Chem. Res. 39:550-553 (2000).

(Continued)

*Primary Examiner*—Matthew O Savage
(74) *Attorney, Agent, or Firm*—Nixon Peabody LLP

(57) ABSTRACT

The present invention relates to an organo-ceramic composite material useful for the extraction of metal ions from solution. The organo-ceramic composite material is formed according to a sol gel synthesis scheme by reacting a functional precursor silane and its homopolymers with either (i) a mixture of a cross-linking silane and its homopolymers or (ii) the cross-linking silane, under conditions effective to yield the composite material of the present invention. Further aspects of the present invention relate to methods of removing a metal ion from a water stream and recovering a metal ion from a water stream, both of which include contacting a water stream containing a metal ion with an organo-ceramic composite material of the present invention under conditions effective to remove the metal ion from the water stream.

35 Claims, 10 Drawing Sheets

OTHER PUBLICATIONS

Zhmud et al., "Acid-Base Properties and Electrokinetic Behavior of Amine-Containing Organopolysiloxane Matrices," Journal of Colloid and Interface Science 173:71-78 (1995).

Zhmud et al., "Aminopolysiloxane Gels: Production and Properties," 195:16-27 (1996).

Lee et al., "Sol-Gel Synthesis of High Performance Adsorbents," American Inst. Chem. Engineers, Annual Meeting (Miami, FL) (Nov. 19, 1998).

METHOD OF REMOVING A METAL ION FROM A WATER STREAM USING ORGANO-CERAMIC COMPOSITE MATERIALS

The present application is a divisional of U.S. patent application Ser. No. 09/573,304, filed May 18, 2000, now U.S. Pat. No. 7,358,318, which claims the priority benefit of U.S. Provisional Patent Application Ser. No. 60/134,828, filed May 19, 1999.

This invention was made with government support under grant number CTS-9805118 awarded by National Science Foundation. The government has certain rights in this invention.

FIELD OF THE INVENTION

The present invention relates to organo-ceramic composite materials, methods of using such composite materials as adsorbents to extract or recover metal ions from solution, and methods of making such composite materials using sol gel synthesis schemes.

BACKGROUND OF THE INVENTION

Many industries utilize heavy metals and/or rare earth metals in their manufacturing processes. Such use typically results in liquid (generally aqueous) waste streams that contain residues of the rare earth or heavy metals utilized in the given manufacturing process. For example, the waste streams resulting from electronics, hydrometallurgical, electrochemical metal refining, electroplating, and photographic processes typically contain metal ions such as copper, nickel, zinc, chromium (III), chromium (VI), cadmium, aluminum, lead, antimony, silver, and gold, amongst others in various aqueous solutions such as sulfates, chlorides, fluoroborates and cyanides. Because of the potential adverse effect of such substances on health and the environment, the removal of rare earth metals and heavy metal ions from aqueous waste streams is a problem of continuing significance.

Mining industries are also responsible for contributing significantly to pollution of waterways and groundwater, including wells, as a result of contaminated waste streams (i.e., acid mine drainage solutions) flowing into such water sources. For example, the Berkeley Pit is a vast open-pit mine located in an ore-rich section of southwestern Montana which has been closed since the 1980's. The Berkeley Pit is filled with some 17 billion gallons of water which contains high concentrations of various metal ion contaminants, including aluminum (approximately 2.6 mg/L), cadmium (approximately 2.1 mg/L), calcium (approximately 450 mg/L), copper (approximately 170 mg/L), iron (approximately 1070 mg/L), lead (approximately 0.03 mg/L), magnesium (approximately 400 mg/L), manganese (approximately 185 mg/L), sodium (approximately 75 mg/L), zinc (approximately 550 mg/L), nitrate (less than 1 mg/L), and sulfate (approximately 7600 mg/L). Not only is the clean up of such waste sites important from an environmental aspect, but the recovery of such useful metals is important from an economical perspective as well.

A variety of polymeric systems have been developed and applied for metal separations from aqueous solutions. Organo-polymeric synthesis techniques are well established and polymeric metal extractants can be tailored and adapted for specific applications, such as noble metal separations, nuclear waste treatments, and electroplating waste clean-up. Polymeric extractants can be classified as either water-soluble polymer systems or solid-resin systems.

In the case of noble metal and platinum group metal separations, improved methods to more efficiently separate these precious commodities from ore body leach solutions are a continual need, particularly as the quality of ores decline. Because gold, platinum, silver, etc. are in significant demand for use in various commercial products and processes, the recovery of such precious metals from ore solutions will, over time, accommodate this increased demand.

Water-soluble polymer systems for metal extraction utilize water-soluble polymers which are separated from solution (i.e., following extraction) using ultrafiltration techniques. An attractive feature of this system includes the elimination of diffusive mass transfer resistance which exists in solid supports, thereby yielding faster extraction rates than most solid resin systems (Smith et al., *ACS Symposium Series* 716: 294-330 (1999), and Jarvinen et al., *Proceedings of A Symposium Sponsored by Engineering Foundation Conference and National Science Foundation*, The Mineral, Metals & Materials Society, Hawaii, pp. 131-138 (1999)).

Solid-resin systems have been studied widely and applied for many applications over the latter half of the past century (Al-Bazi et al., *Talanta* 31:815-836 (1984); Kantipuly et al., *Talanta* 37:491-517 (1990); and Alexandratos et al., *Macromolecules* 29:1021 (1996)). Of particular interest are inorganic network systems, which have received much attention due to their mechanical strength, thermal stability, wide range of particle size, and well-defined pore structure. The well-defined pore structure is important for creating an environment in which the metal ions can diffuse in the solid matrix.

The inorganic network systems have typically been created using either solvent deposition or covalent bonding techniques to immobilize a functional extractant or chelating agent to the solid support. Surface attached hydroxy groups such as Si—OH, Ti—OH, Zr—OH, and Al—OH, which are common to most inorganic supports, provide the reactive sites for surface modification. The density of the hydroxyl groups for silica gel support is constant for a fully hydroxylated surface (8 μmol $OH/m^2$).

In order to prepare inorganic chemically active adsorbents with high stability, capacity, and kinetic rates equal or greater than pore diffusion rates, the chelating agent(s) should possess the following properties: very low solubility in water; hydrocarbon chains away from the complexing moiety to retain hydrophilicity at the complexing end and to prevent steric hindrance to the formation of chelate rings; sufficient thermal stability so that the extract moiety is not destroyed or altered during immobilization (i.e., while heating to remove excess solvent); sterically compact geometry that is compatible (as well as comparable) to the pore size and pore volume of the functional support, which enables the extractant to penetrate into the pores and interact with the bonded functional groups; and sufficient chemical stability to retain activity during operation and regeneration. Two approaches can be used to make these materials: solvent deposition and covalent attachment.

Solvent deposition techniques are performed by immobilizing functional groups on the silica gel via silanization reactions. Various silylating agents can be used. For example, to immobilize alkyl groups, a dialkyl-dichloro-silane can be used. The chain length of the functional alkyl group is selected on the basis of desired pore size and pore volume of the silica gel. In addition, titanium coatings can be added to the surface through the silanol group in order to prevent dissolution of the surface in highly caustic solutions. After the functional groups have been deposited onto the silica gel, extractant or chelating agent(s) are deposited by dissolving the agent(s) in a solvent, immersing the silica gel in the solvent solution, and subsequently evaporating the solvent.

Covalent attachment of extracting or chelating agent(s) to an inorganic support is a very elegant approach. This approach typically can produce inorganic chemically active adsorbents with greater stability, selectivity, and adsorption rates. Covalent bonds between an organic moiety (i.e., an extracting or chelating agent) and a substrate are formed through an intermediary coupling agent. Selection of the functional group to be immobilized depends on the intended application. The groups taking part in the formation of chelate rings usually include nitrogen, oxygen, and sulfur atoms. The attachment of specific complexing groups into organic matrices makes them capable of reacting with metal ions, owing to the coordinate covalent or ionic bond. The interaction between metal ion and functional group depends on properties of the metal (e.g., charge, size, coordinate number), adsorption conditions (e.g., solution pH, ionic strength), functional group, and physical nature of the matrix (i.e., steric factors). Chelate rings can be formed with the participation of donor atoms situated in one unit of matrix or at the matrix chain. Accordingly, highly selective inorganic chemically active adsorbents can be prepared by careful planning and execution of synthesis schemes to introduce desired donor atoms in a preferred geometry.

In performing covalent attachment, selected extracting or chelating agent(s) or derivatives of functional groups capable of complexing the desired metal ions are attached to the silica surface of the inorganic support. The functional groups can be attached to the support using commercially available silane coupling agents. This attachment is performed according to one of two methods. According to one approach, the coupling agent is first attached to the silica surface, then a functional group precursor is attached to the lattice, and the precursor modified to yield the desired functional group. According to another approach, the silane coupling agent and functional group are bonded together, then the resulting functional silane coupling agent is covalently attached to the silica support. Details of these synthesis procedures are disclosed, for example, in U.S. Pat. Nos. 5,612,175, 5,616,533, 5,624,881 and 5,668,079 to Tavlarides et al.

Similar approaches have been employed using specially designed meso-porous silica material (Feng et al., *Science* 276:923-926 (1997), and Mercier et al., *Environ. Sci. Technol* 32:2749-2754 (1998)) Meso-porous silica material are attractive supports because they have high surface area (i.e., up to about 1500 m²/gm) and well-defined uniform pore size. In the synthesis of these extractant materials, a series of silanizations with a silane containing a functional moiety has been performed to increase ligand density on the meso-porous silica. With this technique, up to about 3.2 mmol/gm of mercury uptake capacity has been reported (Mattigod et al., *Proceedings of A Symposium Sponsored by Engineering Foundation Conference and National Science Foundation*, The Mineral, Metals & Materials Society, Hawaii, pp. 71-79 (1999)).

Certain organo-ceramic composite materials prepared via a direct sol gel reaction have also been described. In such direct sol gel reactions, a cross-linking silane and a functional precursor silane are co-polymerized and co-condensed to yield an organo-ceramic composite material that contains functional moieties dispersed randomly throughout the composite material. For example, Zhmud et al., "Acid-Base Properties and Electrokinetic Behavior of Amine-Containing Organopolysiloxane Matrices," *J. Colloid Interface Sci.* 173: 71-78 (1995), describes the formation of such composite materials by directly reacting (i.e., in a co-condensation reaction) a tetraalkoxysilane and a trialkoxysilane containing a functional amino or imidizole moiety. The specific reaction parameters and the properties of the resulting composite materials are described in Zhmud et al., "Aminopolysiloxane gels: Production and Properties," *J. Non-crystall. Solids* 195: 16-27 (1996). While such organo-ceramic composite materials can be used as metal adsorbents, they are not as desirable as the organo-ceramic composite materials of the present invention, because the dispersion and density of the functional moiety in the resulting gel is random and cannot easily be controlled during the direct co-condensation reaction.

While the above-described compositions are capable of effecting metal ion adsorption, vast improvements would be desirable for various characteristics of such compositions. For instance, it would be desirable to obtain compositions which are characterized by higher ligand densities, controlled clustering of ligands throughout the matrix, and better controlled pore characteristics. By improving these characteristics, it should be possible to achieve higher capacity extraction rates. Accordingly, there still exists a need for more cost efficient processes for the separation and removal of metal ions from waste streams by producing compositions having a variety of chelating agents which are specific and selective toward desired metal ions.

The present invention overcomes the various deficiencies in the art.

SUMMARY OF THE INVENTION

One aspect of the present invention relates to an organo-ceramic composite material. The organo-ceramic composite material includes a copolymer of formula (I)

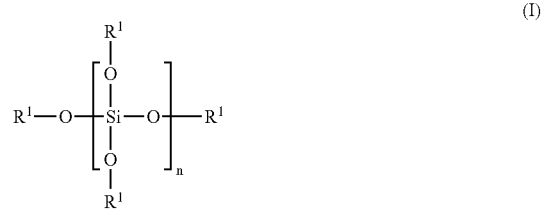

(I)

which includes homopolymers of formulae (II), (III), (IV), or combinations thereof,

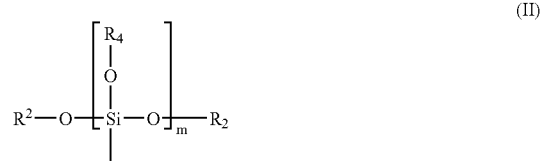

(II)

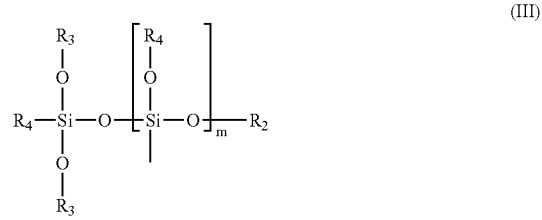

(III)

-continued

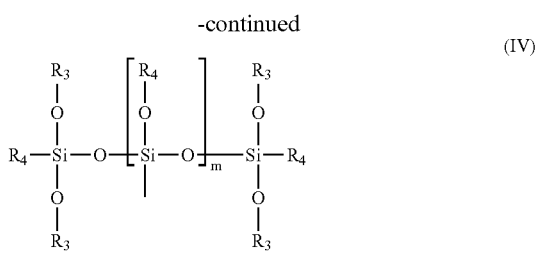

(IV)

wherein $R^1$ is independently $R^3$, $R^5$,

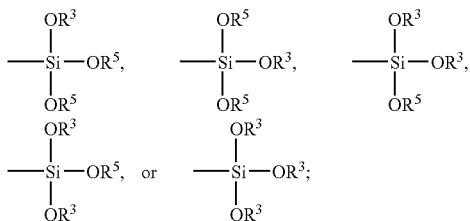

$R^2$ is independently H or an alkyl group having from 1 to 5 carbon atoms;
$R^3$ is independently $R^2$

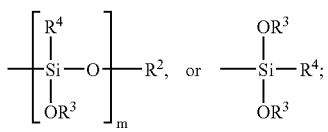

$R^4$ is a functional group having adsorption activity;
$R^5$ is independently $R^2$ or

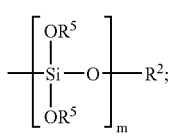

n is an integer greater than 10 and m is an integer greater than 1; and homopolymers of formulae (II), (III), (IV), or combinations thereof are present in the composite material at a higher concentration as compared to their concentration in an organo-ceramic composite material formed via direct co-condensation of a cross-linking silane and a functional precursor silane.

Another aspect of the present invention relates to a method of making an organo-ceramic composite material of the present invention, which includes reacting a mixture including a functional precursor silane and its homopolymers with either (i) a cross-linking silane or (ii) a mixture including the cross-linking silane and its homopolymers. The reaction is carried out under conditions effective to yield an organo-ceramic composite material of the present invention.

Still another aspect of the present invention relates to a method of removing a metal ion from a water stream. This method is carried out by providing an organo-ceramic composite material of the present invention and contacting a water stream containing a metal ion with the organo-ceramic composite material of the present invention under conditions effective to remove the metal ion from the water stream.

Yet another aspect of the present invention relates to a method of recovering a metal ion from a water stream. This method is carried out by providing an organo-ceramic composite material of the present invention, contacting a water stream containing a metal ion with the organo-ceramic composite material under conditions effective for the organo-ceramic composite material to adsorb the metal ion from the water stream, stripping the adsorbed metal ion from the organo-ceramic composite material under conditions effective to yield a concentrate of the metal ion, and recovering the metal ion from the concentrate.

The organo-ceramic composite materials of the present invention are characterized by high ligand densities, controlled clustering of the ligands throughout the matrix, and controlled pore characteristics. In particular, with respect to ligand densities, there exists a higher concentration of functional homopolymers or oligomers (i.e., dimers, trimers, etc.) within the composite material. By increasing the ligand densities and maintaining uniform pore characteristics to enable diffusion of metal ions through the matrix, the composite materials of the present invention can achieve extractions rates for numerous metal ions which far exceed those previously obtained. Without being bound by theory, it is believed that the higher concentration and/or controlled clustering of ligands is responsible for higher metal ion extraction capacities obtained using the composite materials of the present invention. This offers far superior metal ion recovery than previously obtained with current extraction materials, yielding both economic and environmental benefits.

BRIEF DESCRIPTION OF THE DRAWINGS

FIG. 3A is three-dimensional composite graph prepared from multiple $^{29}$Si-NMR spectra of time-course samples (from 15 minutes to 5 hours) of the self-condensation solution containing the functional precursor silane. Representative structures of the functional precursor silane ($T_0$) and various self-condensation products ($T_1$, $T_2$, $T_3$, and $T_A$) are also shown. The designations $T_n$ represent structures containing the number (n) of Si—O—Si bonds in each compound. Thus, $T_0$ is the functional precursor silane which contains no Si—O—Si bonds, $T_1$ is a dimer of the functional precursor silane which contains a single Si—O—Si bond, $T_2$ is a trimer of the functional precursor silane which contains two Si—O—Si bonds, and so on. $T_A$ is an oligomer of the functional precursor silane which contains two Si—O—Si bonds in a cyclic structure. FIG. 3B is a graph depicting the relative concentration over the time-course of the self-condensation reaction for the functional precursor silane ($T_0$) and various self-condensation products ($T_1$, $T_2$, $T_3$, and $T_A$). Relative concentrations were calculated from the $^{29}$Si-NMR spectra.

DETAILED DESCRIPTION OF THE INVENTION

Figure 1:
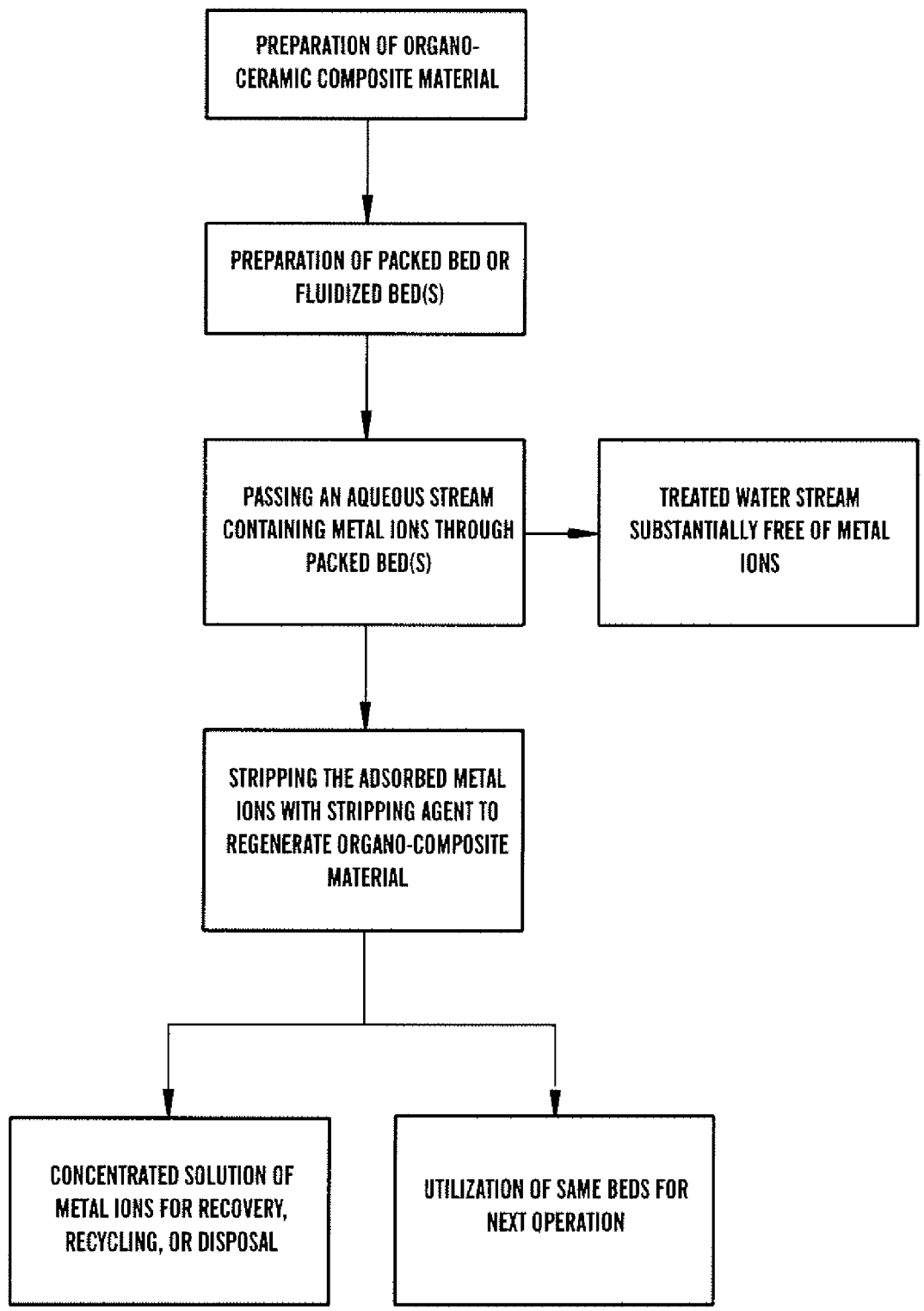
FIG. 1 is a flow chart of the process for separation and recovery of metal ions with the organo-ceramic composite material of the present invention.

One aspect of the present invention relates to an organo-ceramic composite material which is particularly useful for extraction of metal ions from solutions, particularly waste water. The organo-ceramic composite material of the present invention is a copolymer of formula (I)

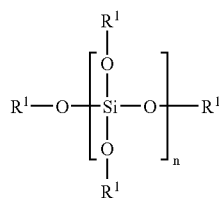
(I)

which includes homopolymers of formulae (II), (III), (IV), or combinations thereof,

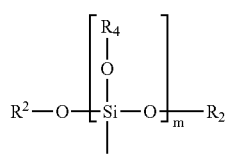
(II)

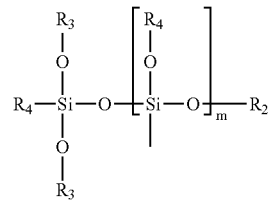
(III)

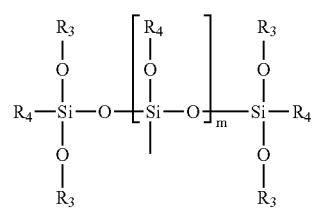
(IV)

wherein $R^1$ is independently $R^3$, $R^5$,

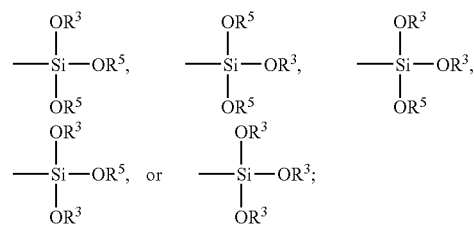

$R^2$ is independently H or an alkyl group having from 1 to 5 carbon atoms;

$R^3$ is independently $R^2$

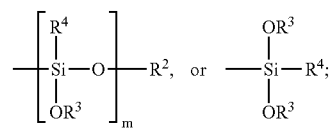

$R^4$ is a functional group having adsorption activity;

$R^5$ is independently $R^2$ or

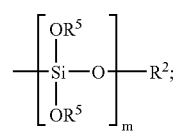

n is an integer greater than 10 and m is an integer greater than 1; and the homopolymers of formulae (II), (III), (IV), or combinations thereof are present in the composite material at a higher concentration as compared to the concentration present in a organo-ceramic composite material formed via direct co-polymerization and co-condensation of a tetraalkoxysilane and a organo-functionalized trialkoxysilane.

When $R^2$ is alkyl, the alkyl substituent can be any $R^6$ or $R^7$ group as defined infra for the functional precursor silane and the cross-linking silane.

In the organo-ceramic composite materials of the present invention, the functional group ($R^4$) can be any suitable functional group that can be integrated into the organo-ceramic composite material of the present invention while retaining its adsorption activity. Preferred functional groups includes those having thiol, amino, imino, carbonyl, imidazole, pyrazole, pyrrogalol, ammonium, or phospho acid adsorption functionality. Exemplary functional groups for use in the organo-ceramic composite materials of the present invention include, without limitation, the following:

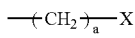
1)

wherein a is an integer from 1 to 5 and X is SH; $NH_2$;

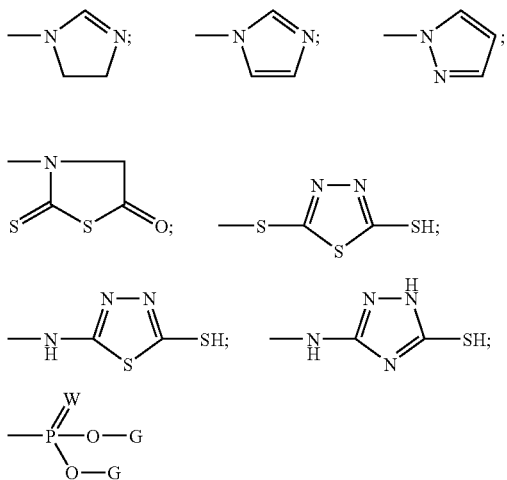

wherein W is sulfur or oxygen, and G is hydrogen or an alkyl group having from 1 to 5 carbon atoms;

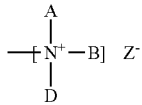

wherein two or three of A, B, and D are an alkyl group having from 1 to 5 carbon atoms and the other of A, B, and D is a hydrogen, and $Z^-$ is a halide ion;

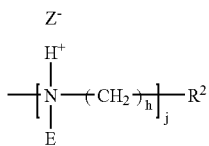

wherein h is an integer from 1 to 5, j is an integer from 1 to 10, E is —$H_2CH_3$; and $Z^-$ is a halide ion; or

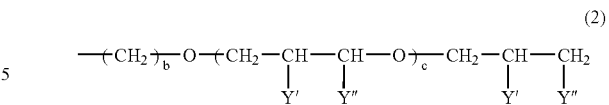
(2)

wherein b is an integer from 0 to 5, c is an integer from 1 to 5, and Y' and Y" are different and each is $NH_2$ or OH.

As used herein, a halide ion can be any halide ion, but preferably a bromine ion, chlorine ion, or iodine ion.

The organo-ceramic composite materials can be prepared according to a number of suitable sol gel reactions. These sol gel reactions can generally be performed in any suitable manner by reacting a functional precursor silane (i.e., a silane to which a functional group having adsorption activity has been bonded) and its homopolymers with either (i) a cross-linking silane or (ii) a mixture of the cross-linking silane and its homopolymers. The reaction is performed under conditions effective to yield an organo-ceramic composite material of the present invention. These sol gel reactions can be performed by (1) first hydrolyzing and homo-polymerizing (i.e., self-condensing) the functional precursor silane, followed by hydrolyzing and co-condensing the cross-linking silane with the functional precursor silane and its homopolymers; or (2) first hydrolyzing and homo-polymerizing both the cross-linking silane and the functional precursor silane independent of one another, followed by co-condensation of the functional precursor silane and its homopolymers with the cross-linking silane and its homopolymers.

These sol gel reactions are defined generally by the following synthesis schemes, which utilize the following components: a functional precursor silane (X moles); a cross-linking silane (X' moles); water (Z moles); an organic or mineral acid (A moles); and an alcohol, such as methanol, ethanol, isopropanol, etc. (Y moles). In circumstances when the functional moiety of the functional precursor silane is a mild base, the organic or mineral acid is optional. Thus, in certain circumstances, the functional precursor silane, alcohol, and water are all that is needed to hydrolyze and self-condense the functional precursor silane.

Synthesis Route 1:

The functional precursor silane is introduced into a solution containing water, an organic or dilute mineral acid, and alcohol to hydrolyze and homo-polymerize the functional precursor silane. This self-condensation reaction is carried out for about 15 minutes to about 5 hours, preferably from about 30 minutes to about 5 hours. This self-condensation reaction can be carried out at room temperature, although changes in the reaction temperature can be accommodated with modified self-condensation times. The molar ratio of X:Y:Z:A introduced into the precursor solution is about 1:2-10:0.5-10:0-1.1, preferably about 1:3:0.5-3:0-1.1.

In a separate vessel, the cross-linking silane is introduced into a solution containing the water, organic or mineral acid, and alcohol to hydrolyze and homo-polymerize the cross-linking silane. This self-condensation reaction is carried out for about 15 minutes to about 5 hours, preferably from about 15 minutes to about 1 hour. This self-condensation reaction can be carried out at room temperature, although changes in the reaction temperature can be accommodated with modified self-condensation times. The molar ratio X':Y:Z:A in the cross-linking solution is about 1:2-10:0.5-10:0.0001-0.5, preferably about 1:4:4:0.005-0.1. The molar ratio of X:X' is about 1:0.5-5, preferably about 1:2-3.

After homo-polymerization of the two silanes as described above, the two homo-polymerized solutions are mixed and agitated to co-polymerize the cross-linking silane and its homopolymers with the functional precursor silane and its homopolymers. This co-polymerization step is carried out for about 30 seconds to about 8 hours, preferably about 1 minute to about 6 hours, more preferably about 5 minutes to about 1 hour. Following the desired co-condensation time, the solution is gelled by introducing into the solution a desired amount of a trialkylamine at a molar ratio of trialkylamine to total silicon of about 0.0001-2:1, preferably about 0.007-1.08:1. The resulting gel is then aged at about 25° C. for a given period of time, preferably at least about 30 minutes and preferably not more than about 24 hours. After aging, the gel can be either dried in an oven at a suitable temperature (i.e., about 40° C. to about 100° C., preferably about 60° C. to about 100° C.) or hydro-thermally treated.

The hydro-thermal treatment is carried out by heating the gel to a temperature of up to about 60° C. in a water in acetone solution (preferably about 5 to about 50 v/v %). This is carried out for a sufficient amount of time, preferably about 1 to about 15 hours, more preferably about 3 to about 12 hours. Afterward, the gel is filtered and placed in a pure acetone solution at about 60° C. to exchange water in gel pores with acetone. The acetone is preferably replaced about 5 times in the following 24 hours. The solution is refluxed during these treatments. Afterward, the treated gel is dried in an oven, preferably at a temperature of about 80° C.

An alkali salt may optionally be added to the self-condensation and/or co-condensation solutions to enhance metal uptake capacity. The alkali salt, when introduced, is added in a molar ratio of alkali metal to total silicon (i.e., present from both types of silanes) in the system of about 0.0001-0.1:1, preferably about 0.001-0.1:1, more preferably about 0.01:1.

Synthesis Route 2:

The functional precursor silane is introduced into a solution containing the water, organic or mineral acid, and alcohol to hydrolyze and homo-polymerize the functional precursor silane. This self-condensation reaction is carried out for about 15 minutes to about 5 hours, preferably from about 30 minutes to about 5 hours, more preferably from about 2 hours to about 4 hours. This self-condensation reaction can be carried out at room temperature, although changes in the reaction temperature can be accommodated with modified self-condensation times. The molar ratio of X:Y:Z:A introduced into the precursor solution is about 1:2-10:2-10:0.0001-1.5, preferably about 1:3:6-9:0.01-1.1.

In a separate vessel, the cross-linking silane is mixed with alcohol at a molar ratio of X':Y of about 1:2-10, preferably about 1:4.

After the desired time for hydrolysis and homo-polymerization of the precursor silane, the cross-linking silane and alcohol mixture is introduced to the self-condensed precursor solution to hydrolyze the cross-linking silane and co-polymerize the functional precursor silane and its homopolymers with the cross-linking silane. The molar ratio of functional precursor silane, based on starting materials, is about 1:0.5-5, preferably about 1:2-3. This co-polymerization step is carried out for about 30 seconds to about 8 hours, preferably about 1 minute to about 6 hours, more preferably about 10 minutes to about 1 hour. Following the desired co-condensation time the solution is gelled by introducing into the solution additional water to make the molar ratio of total water in the solution to total silane to be 8-15:1, if desired, and/or a desired amount of trialkylamine at a molar ratio of trialkylamine to total silicon of about 0.001-2:1, preferably about 0.007-1.08:1. The resulting gel is then aged at about 25° C. for a given period of time, preferably at least about 30 minutes and preferably not more than about 24 hours. After aging, the gel can be either dried in an oven at a suitable temperature (i.e., about 40° C. to about 100° C., preferably about 60° C. to about 100° C.) or hydrothermally treated as described in the Synthesis Route 1.

As noted above in the description of Synthesis Route 1, alkali salt may be added to the self-condensation and/or co-condensation solutions to enhance metal uptake capacity.

In each of the above-described synthesis schemes, a cross-linking silane is utilized. The cross-linking silane is preferably a tetraalkoxysilane according to formula (V) as follows:

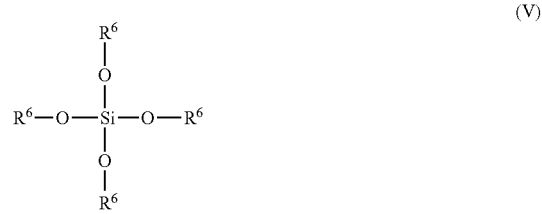

(V)

wherein $R^6$ is an alkyl group having from 1 to 5 carbon atoms. Each $R^6$ substituent independently can be either straight-chain or branched-chain, but preferably straight-chain. Most preferred tetraalkoxysilanes are tetramethoxysilane, tetraethoxysilane, tetrapropyloxysilane, and tetrabutoxysilane.

When hydrolyzed and self-condensed (i.e., as described above), the cross-linking silane forms a homopolymer according to formula (VII) as follows:

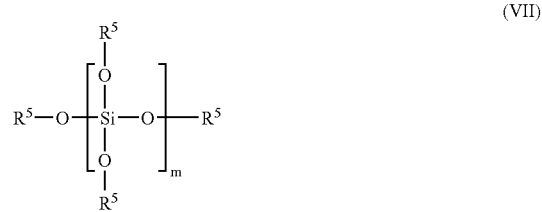

(VII)

wherein $R^5$ is as described above.

In each of the above-described synthesis schemes, a functional precursor silane is also utilized. The functional precursor silane is preferably a trialkoxysilane according to formula (VI) as follows:

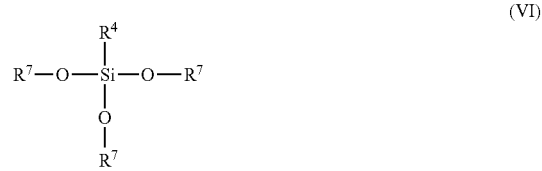

(VI)

wherein $R^7$ is an alkyl group having from 1 to 5 carbon atoms and $R^4$ is a functional moiety having adsorptive activity as described above. Each $R^7$ substituent of the trialkoxysilane independently can be either straight-chain or branched-chain, but preferably straight-chain. Most preferred trialkoxysilanes are trimethoxysilanes, triethoxysilanes, tripropyloxysilanes, and tributoxysilanes.

When hydrolyzed and self-condensed (i.e., as described above), the functional precursor silane forms the homopolymers of formulae (II), (III), (IV), or combinations thereof.

A number of suitable functional precursor silanes are commercially available, i.e., without further modification or treatment, for use in preparing organo-ceramic composite materials of the present invention according to the above-described synthesis schemes. Exemplary commercially available functional precursor silanes include, without limitation, thiol such as 3-mercaptopropyltrimethoxysilane ("MPS") (available from Gelest, Inc., Tullytown, Pa.); amine such as (3-trimethoxylylpropyl)-diethylenetriamine (available from Gelest, Inc.); and imidazole such as (N-(3-triethoxysilylpropyl)-4,5-dihydroimidazole) ("IPS") (available from Gelest Inc.).

Other suitable functional precursor silanes can be prepared by introducing the functional moiety into the trialkoxysilane, i.e., by covalent bond. The functional moiety can be bonded to the silane molecule in any manner which still affords the functional precursor silane the opportunity to be hydrolyzed and either self-condensed to one or more functional precursor silanes, co-condensed to one or more cross-linking silanes, or both.

It is preferred that the functional moiety be covalently bonded to silicon either directly or indirectly through an alkyl, alkenyl, or alkynyl chain. A number of approaches are available for covalently bonding the various suitable functional moieties $R^4$ to a trialkoxysilane, thereby preparing a functional precursor silane. Typically, the method for attaching the functional moiety will depend upon the type of functional moiety being attached.

Two major available routes for the synthesis of functionalized trialkoxyalkylsilanes are alkylation and hydrosilylation (Deschler et al., "3-Chloropropyltrialkoxysilanes-Key Intermediates for the Commercial Production of Organofunctionalized Silanes and Polysiloxanes," Angew. Chem. Int. Ed. Engl. 25: 236-252 (1985), which is hereby incorporated by reference). Amines can easily react with trialkoxyhaloalkylsilane, such as chloropropyltrimethoxysilane and bromopropyltrimethoxtysilane, in an organic base solution. For example, pyrazole is reacted with chloropropyltrimethoxysilane to produce a functional precursor for the organo-ceramic composite adsorbent in a diisopropylethylamine solution as shown below:

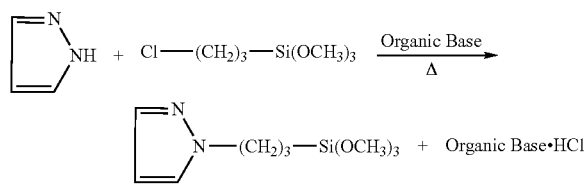

Hydrosilylation reactions also can be used to produce desired functional precursor silanes. Organic compounds containing an unsaturated carbon can be reacted with trialkoxysilane or trichlorosilane under presence of catalysts such as palladium or platinum catalysts. For example, allyl rhodanine can be reacted with triethoxysilane to produce a functional precursor silane such as shown below:

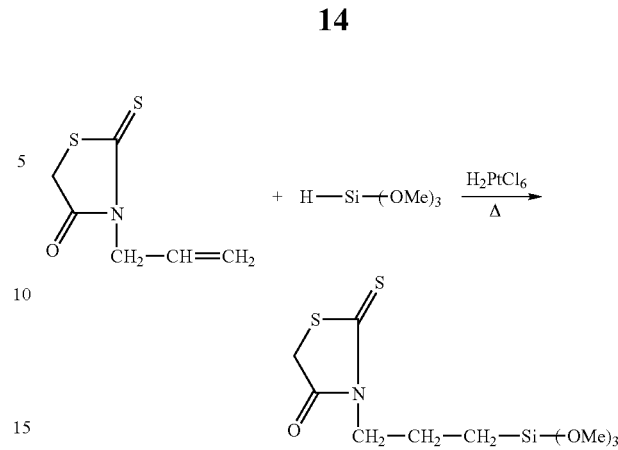

Attaching a functional moiety ($R^4$) to a trialkoxysilane to be used as a starting material can be performed as described above, or as described in U.S. Pat. Nos. 5,612,275, 5,616,533, 5,624,881, 5,668,079, 5,690,832, 5,779,906, 5,814,226, and 5,817,239, all to Tavlarides et al., which are hereby incorporated by reference.

Figure 3A:
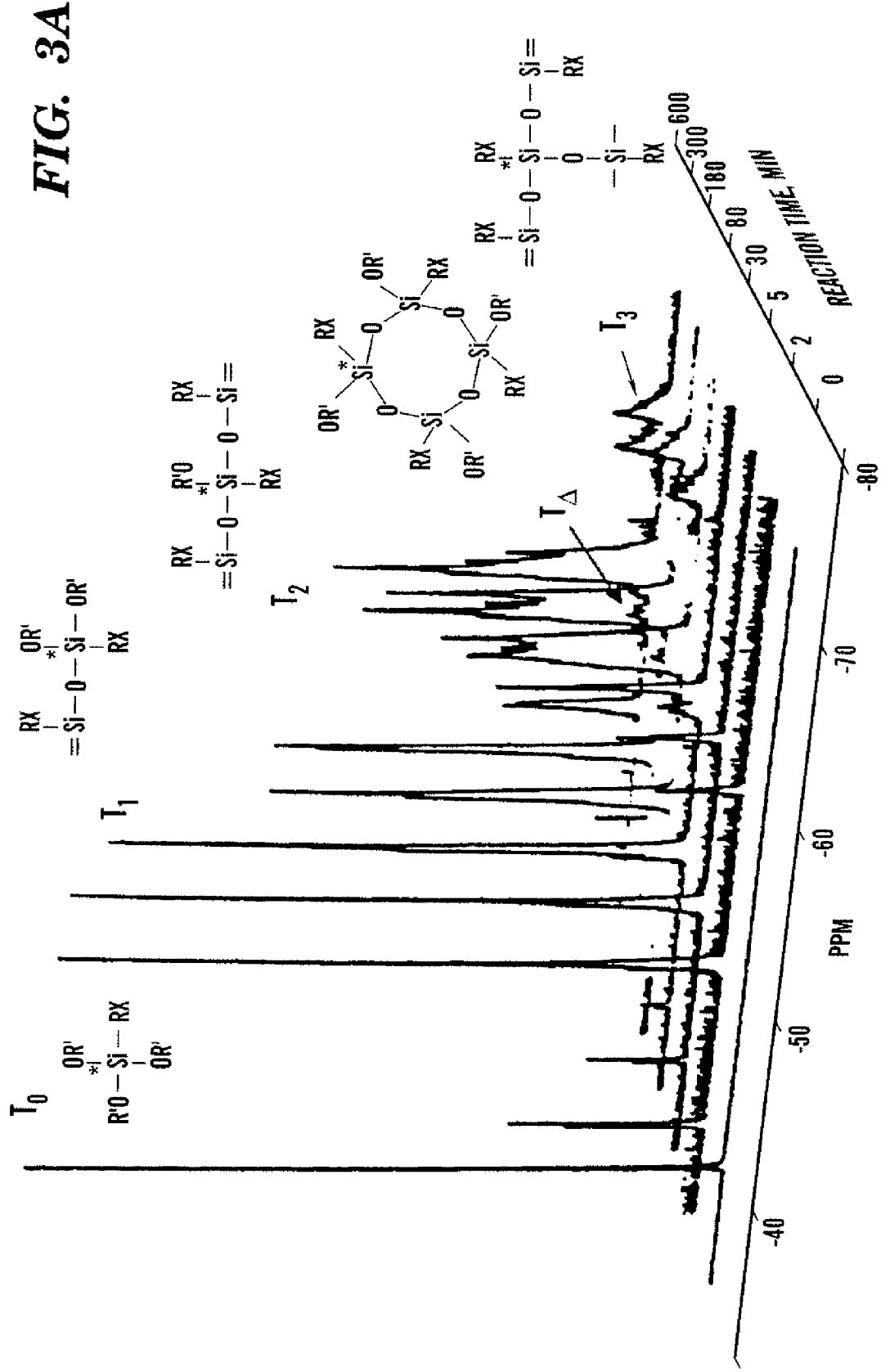
FIGS. 3A and 3B depict the time-course of the self-condensation reaction of the functional precursor silane 3-mercaptopropyltrimethoxysilane.
Figure 3B:
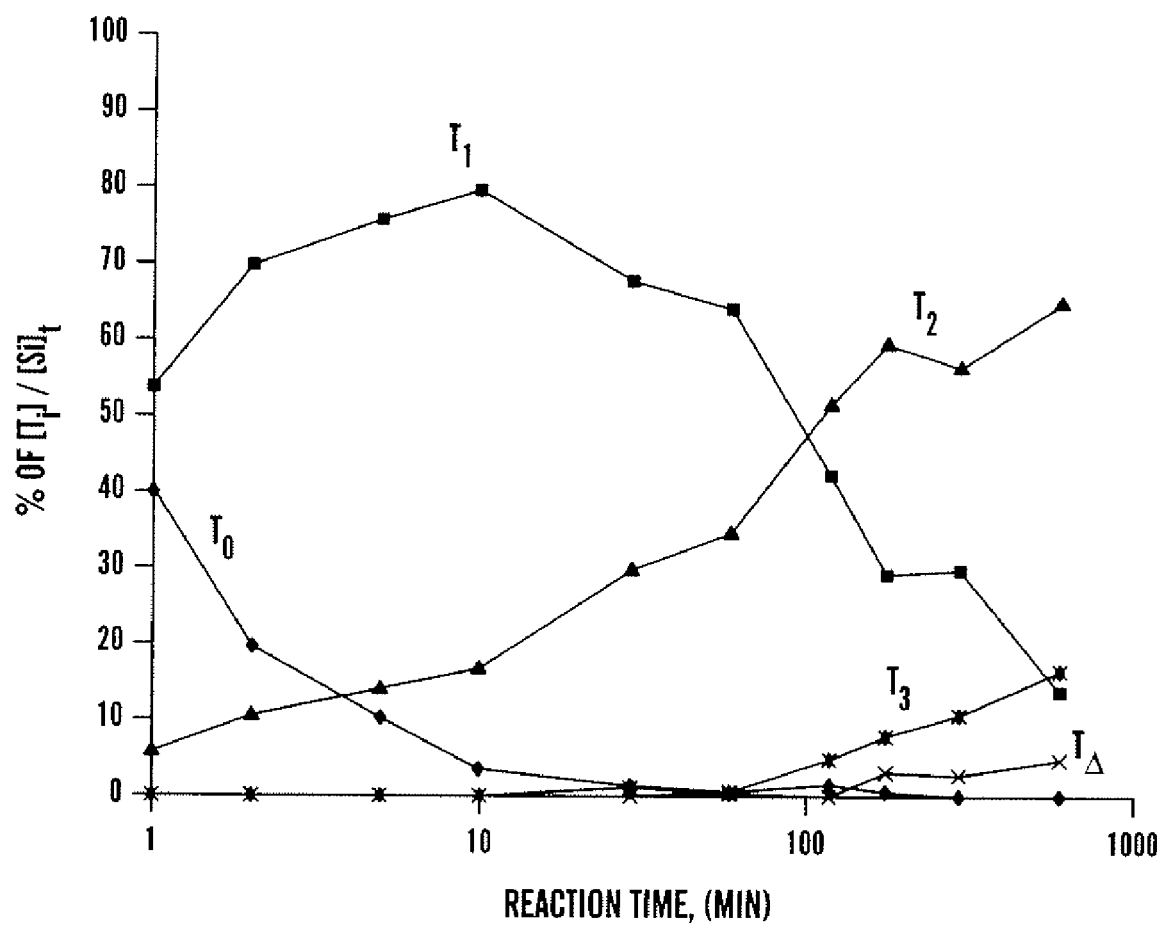
Figure 4:
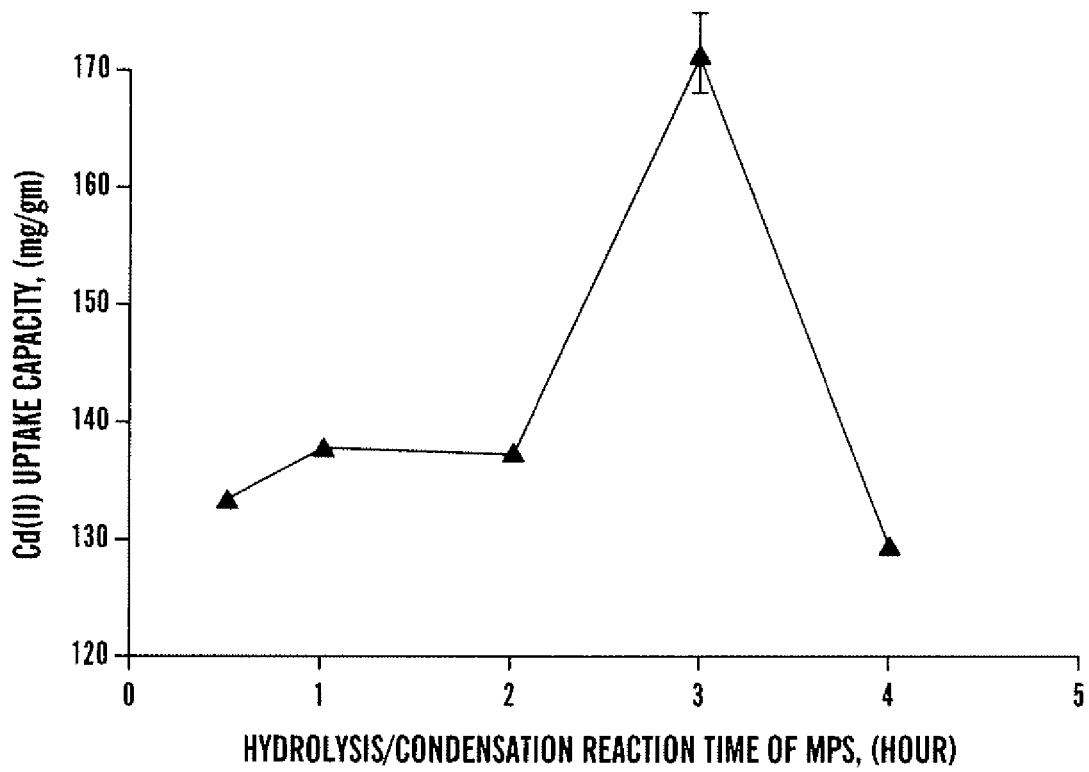
FIG. 4 is a graph depicting the trend of cadmium uptake capacity in comparison to the degree of self-condensation of the functional precursor silane. The maximum cadmium uptake for the organo-ceramic composite material containing a propyl/thio functional moiety occurs when the functional precursor silane is self-condensed for about 3 hours.

As a result of the functional precursor silane homopolymerization (i.e., self-condensation), a number of different types of homopolymers are prepared. Typically, the relative proportion of different homopolymers (i.e., dimers, trimers, etc.) can be controlled by regulating the time of the self-condensation reaction. As shown in FIGS. 3A and 3B, which is specific for the MPS-containing precursor silane, the relative concentration of the functional precursor silane ($T_0$) declines rapidly and within 15 minutes, the dimer ($T_1$) is the predominant species. After about 4 minutes, the dimer ($T_1$) remains the predominant species and the trimer ($T_2$) becomes the second most prevalent species. As the self-condensation reaction continues to about 30 minutes, the concentration of the functional precursor silane ($T_0$) is negligible. At about 120 minutes, the trimer ($T_2$) becomes the predominant species. Generally speaking, optimal metal ion adsorption can be achieved when the co-condensation step occurs after the concentration of the trimers ($T_2$) approaches its maximal concentration (i.e., about 2-4 hours), although the optimal time for homopolymerization will vary for different functional precursor silanes depending on the type of functional moiety ($R^4$).

The organo-ceramic composite materials of the present invention are characterized by an average pore size of about 5 Å to about 500 Å, preferably about 5 Å to about 200 Å, and a functional group density of about 0.1 mmol/g to about 10 mmol/g, preferably about 0.5 mmol/g to about 8 mmol/g.

The organo-ceramic composite material is usually further treated prior to its use as an adsorbent material. This treatment includes crushing or pulverizing the dried gel produced as described above. The resulting particles of the organo-ceramic composite material preferably have a mean particle size of about 10 to about 500 μm, more preferably about 75 to about 200 μm. In addition, the resulting composite material typically will have a bulk density ranging from about 0.2 g/cm$^3$ to 0.9 g/cm$^3$, preferably 0.3 g/cm$^3$ to 0.7 g/cm$^3$, depending on chemical compositions and synthesis methods employed.

Once the organo-ceramic composite material of the present invention has been prepared, it can be used as a metal ion adsorbent material for removal and or recovery of metal ions from aqueous solution. Thus, another aspect of the present invention relates to a method of removing a metal ion from a water stream. This method is carried out by providing an organo-ceramic composite material of the present invention and contacting a water stream containing a metal ion with the organo-ceramic composite material of the present invention under conditions effective to remove the metal ion from the water stream. When used to recover the metal ion, the method further includes stripping the adsorbed metal ion from the organo-ceramic composite material under conditions effective to yield a concentrate of the metal ion, and then recovering the metal ion from the concentrate.

Metal ions which can be removed and/or recovered from solution using a organo-ceramic composite material of the present invention include heavy metal ions, rare earth metal ions, platinum group ions, and noble metal ions. Exemplary rare earth metal ions include, without limitation, cerium, neodymium, and praseodymium. Exemplary platinum group metal ions include, without limitation, ruthenium, rhodium, palladium, osmium, iridium, and platinum. Exemplary noble metal ions include, without limitation, silver and gold. Exemplary heavy metal ions include, without limitation, antimony, arsenic, beryllium, cadmium, chromium, copper, lead, mercury, nickel, selenium, thallium, tin, zinc, molybdenum, cobalt, technetium, rhenium, cesium, and strontium. Other metal ions not specifically enumerated can also be removed from solution using an organo-ceramic composite material of the present invention as an adsorbent material.

Removal of metal ions is preferably performed using an organo-ceramic composite material of the present invention which has been pulverized as described above.

Typically, the organo-ceramic composite materials of the present invention are placed in packed beds or fluidized beds and the waste stream is passed through the bed. The organo-ceramic composite materials act to chelate with the metal ions, even if the ions are present in only dilute concentrations. Examples of useful beds for the organo-ceramic composite materials described herein are found in U.S. Pat. Nos. 4,824,576 to Sood et al. and 4,448,694 to Plueddemann, which are hereby incorporated by reference.

Figure 2:
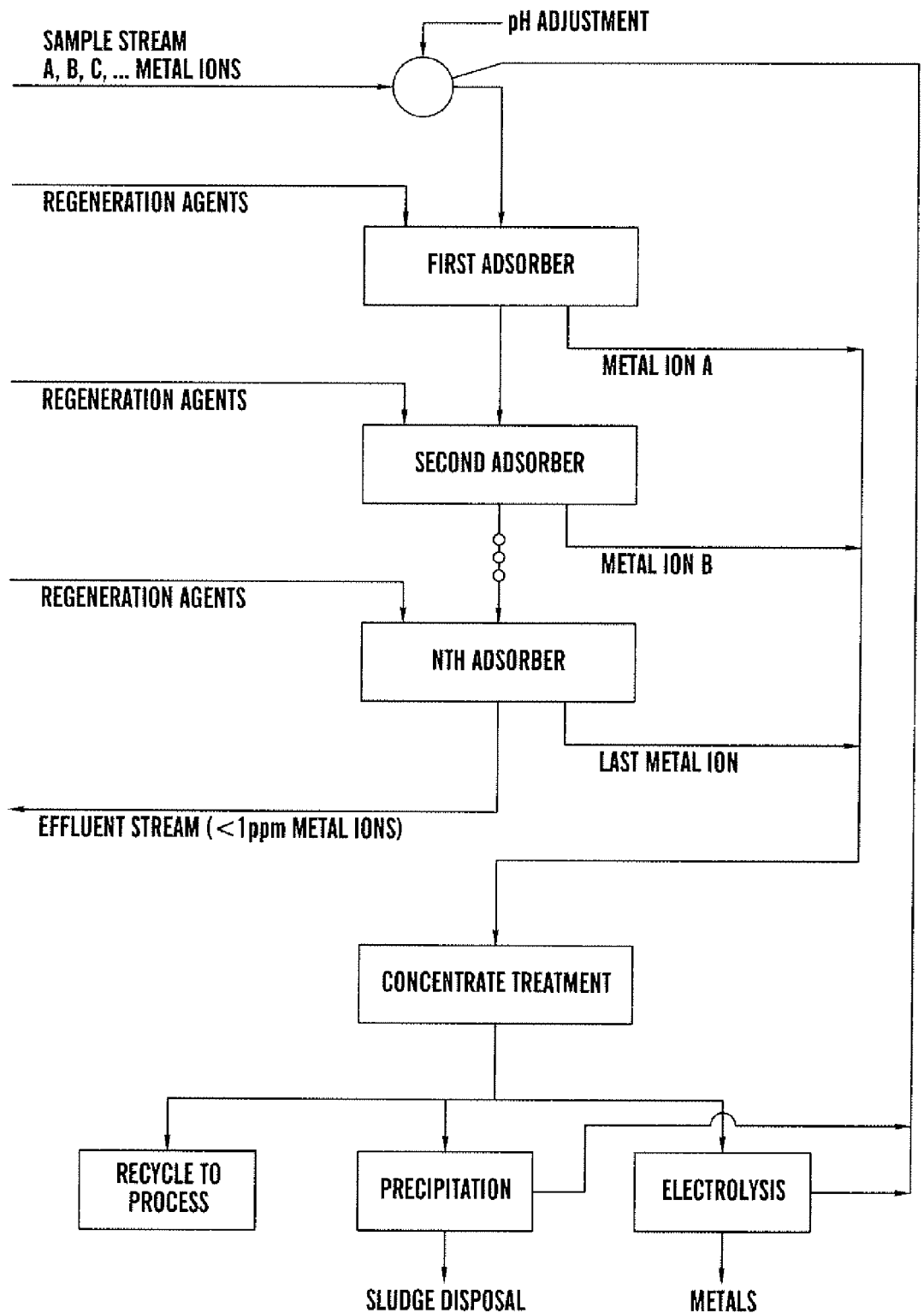
FIG. 2 is a flow chart illustrating the process of the invention using different inventive organo-ceramic composite materials in combination, within a series of multiple adsorbent beds, for metal ion separation and/or recovery.

The organo-ceramic composite materials of the present invention can be used for removal and recovery of metal ions by a variety of methodologies as outlined by FIGS. 1 and 2. FIG. 1 is a process outline for separation and recovery of metal ions with an organo-ceramic composite materials of the present invention. FIG. 2 is a flow sheet illustrating the process of the invention by using a series of multiple adsorbent beds, each containing the same or different organo-ceramic composite material of the present invention, for metal ion separation and/or metal recovery.

The process of metal ion removal of the present invention contemplates several modes of operation. Many factors are considered in choosing the appropriate methodology, including the composition of the aqueous stream to be treated, the industrial process through which the contaminated aqueous stream is generated, the desired purification level of the aqueous stream, the degree of separation of metal ions from the waste stream desired, and the end use of the effluent from the bed.

In one embodiment of the present process, an operation mode can be employed to remove all metal ions simultaneously from an aqueous stream containing multiple (i.e., two or more) metal ions by passing the stream through a single adsorbent packed bed or fluidized bed containing one or more compatible organo-ceramic composite materials of the present invention. The column breakthrough volume (e.g., the volume at which minimum threshold concentration of metal ions in the effluent is exceeded) can be determined by monitoring the metal ion concentration in the effluent with an atomic absorption spectrophotometer, flow injection analysis, ion selective electrodes, or other known methods of metal ion concentration analysis and/or monitoring pH of the effluent.

The loaded column can be regenerated by desorbing the adsorbed metal ions from the column. The adsorbed metal ions can be recovered simultaneously by, for example, stripping substantially all metals from a bed of the organo-ceramic composite material with a stripping agent. Upon regeneration, the organo-ceramic composite material bed can be used for the next operation. The metal ion concentrate obtained during regeneration can be used to recover metals using any technique known in the art. For example, as shown in FIG. 2, the metals are recovered by electrolysis or by recycling the metal concentrate back to the process which first generated the polluted aqueous stream. Alternatively, the metals can be precipitated to form sludge which can subsequently be disposed of in an environmentally safe manner.

Suitable stripping agents include, without limitation, mineral acids (e.g., nitric acid, hydrochloric acid, etc.), thiourea solution, perchloric acid, thiocyanate solution, ammonia solution, or cyanide solution (with or without base). Of these, thiourea solution, perchloric acid, thiocyanate solution, and ammonia solution are commonly used to strip platinum group metals and noble metals, whereas strong acids are typically used to strip heavy metal ions. The concentration of such stripping agents can be varied and one of skill in the art can readily determine the optimal concentration which can be used for a particular stripping process.

As demonstrated in the Examples, infra, the efficiency of the removal process relative to certain metal ions is dependent, at least in part, on the pH of the aqueous stream. Therefore, as shown in FIG. 2, the pH of the stream can be advantageously adjusted if necessary (depending on the organo-ceramic composite material used). This operation is typically performed by buffering an aqueous stream entering the bed of organo-ceramic composite material. Alternatively, instead of employing a buffer solution, it is possible to use a dilute acid or base to adjust the pH of an aqueous stream entering the packed or fluidized bed of organo-ceramic composite material.

The inventive materials have a preferred pH band at which the adsorption efficiency for each metal ion is maximized. At pH above or below this band, the adsorption of metal ions is decreased or the bed operation is impaired due to precipitation of salts in the bed.

At the breakthrough point, the flow of aqueous stream through the bed can be stopped, and the bed can be made operational again by passing one or more bed volumes (i.e., an amount of fluid equal to the volumetric fluid capacity of the bed) of buffer solution through the bed. Buffering the column reestablishes the initial pH and extends the adsorptive life of the column and allows its use for the adsorption of metal ions until the column approaches its adsorption capacity (i.e., the point at which substantially all of the available sites for chelation of metal ions are occupied) as determined by the breakthrough volume.

Adjusting the fluid stream pH with a dilute acid or base (rather than using a buffer at the start) is highly advantageous because it decreases the cost of operation and minimizes the contamination of the effluent aqueous streams with buffer solutions, enabling environmentally safe disposition of the effluent. In some cases, it is possible to determine the breakthrough point by simply monitoring the pH of the effluent stream. In another embodiment of the present process, all the metal ions in a waste stream containing more than one type of species of metal ion can be simultaneously removed by passing the waste stream through the single bed of one or more compatible organo-ceramic composite materials.

The selectivity of the inventive materials is dependent on the particular functional moiety ($R^4$) employed. For example, an organo-ceramic composite material of the present invention can be highly selective, allowing removal of a single metal ion from an aqueous stream containing multiple metal ions by passing the stream through a single packed or fluidized bed of the inventive composite materials where removal, recycling or disposal of only one metal ion is desired. Alternatively, an organo-ceramic composite material can have broad adsorptive activity, allowing removal of more than one metal ion (or single metal ion having different states) by passing the stream through a single packed or fluidized bed of the inventive composite materials, where removal, recycling, or disposal of more than one metal ion is desired. The adsorbed metal ion(s) can be desorbed from the bed of organo-ceramic composite material with a stripping agent of the type described above.

As noted more specifically in the Examples, infra, certain of the inventive materials are capable of removing metal ions for up to 1000 (or more) bed volumes and have extraordinarily high adsorption capacities for a number of different metal ions.

In another embodiment of the process of the present invention, metal ions can be separately and specifically removed by adsorbing those metal ions on a series of metal ion selective beds. As illustrated in FIG. 2, the metal ions can be removed in a sequential manner from the aqueous stream containing a mixture of multiple metal ions by passing the stream through multiple beds where each bed contains an inventive composite that selectively removes one or more metal ions. Preferably, the different composite materials are compatible to remove many, if not substantially all, of the different metal ions in the stream. The breakthrough point of the beds can be determined by monitoring the metal ion concentration in the effluent stream from the column by the methods discussed supra. These multiple beds can then be regenerated as described above and the metal ions removed from the bed can be recycled or disposed of. Depending on the pH requirements of each composite material, the stream can be buffered before and/or after each bed as needed.

Accordingly, the processes and materials of the present invention can substantially remove and separate one or more distinct metal ions (or metal ions having different states) and facilitate maximum utilization of the beds' relative capacities, thereby providing valuable increased efficiency in the metal ion removal process.

EXAMPLES

The following examples are provided to illustrate embodiments of the present invention but they are by no means intended to limit its scope.

Example 1

Preparation of Organo-Ceramic Composite Materials Having a Propyl/Thio Functional Moiety Using Scheme 1

A series of organo-ceramic composite materials having a propyl/thio functional moiety were synthesized according to Synthesis Scheme 1.

MPS was homo-polymerized using the following materials:
4.97 ml (25 mmol), MPS;
4.38 ml (75 mmol) ethanol; and
4.35 ml (75 mmol) of 0.196 mol/L HCl solution.

The ratio of MPS:EtOH:$H_2O$:HCl was 1:3:3:0.034. MPS was homo-polymerized for various periods of reaction time, between 15 minutes and 5 hours.

TEOS was homo-polymerized using varying amount of the following materials:
2.93-17.62 ml (12.5-75 mmol), TEOS;
2.92-17.52 ml (50-300 mmol), ethanol; and
0.9-5.4 ml (50-300 mmol) of 0.083 mol/L HCl solution.

The molar ratio of TEOS:EtOH:$H_2O$:HCl was 1:4:4:0.006. The homo-polymerization time of TEOS was varied from 15 minutes to 5 hours.

After the indicated homo-polymerization times, the self-condensed MPS solutions were mixed with the partially self-condensed TEOS solutions, allowing hydrolysis and co-condensation to occur. The molar ratio of MPS:TEOS varied between 1:0.5-3. Co-condensation was allowed to occur for approximately 1 minute, at which time varying amounts of triethylamine ("TEA") were introduced ([TEA]/[Si]$_t$=7.11×$10^{-3}$-7.11×$10^{-2}$) to form the gels. The gel material was washed with water and acetone, and then dried at 80° C. in an oven for 24 hours.

The synthesized material was crushed with a mortar and pestle to a particle size range of about 75 µm to about 180 µm, washed with water and acetone, and dried in an 80° C. oven overnight. The crushed composite material was stored in a plastic bottle for subsequent use.

Example 2

Effect of TEA Concentration and TEOS/MPS Concentration on Cadmium Uptake, Pore Size, and Surface Area Using different series of similarly treated composite materials obtained from Example 1, the effects of TEA concentration and TEOS/MPS concentration were determined with respect to cadmium uptake, pore size, and surface area. Cadmium uptake capacity was determined using one half gram of each composite material equilibrated with 100 ml of 2,000 mg/L cadmium solution buffered at pH 6.5 with 0.02 M sodium acetate. The solution was maintained at 25° C. in a water bath with gentle shaking. After 24 hours equilibration, the solution is filtered. The cadmium concentrations in the initial solution and the final solution are determined with an atomic absorption spectrometer. The uptake capacity is determined by the difference of cadmium mass in the initial and the final solution per mass of adsorbent. Pore diameter and surface area were measured by nitrogen sorption with an ASAP-2000 instrument (Micromeritics Instrument Co., Norcross, Ga.).

Each of a first series of gels was formed using the following specifications:
MPS:TEOS=1:2
MPS:EtOH:$H_2O$:HCl=1:3:3:0.011
TEOS:EtOH:$H_2O$:HCl=1:4:4:0.006
MPS homo-polymerization time=3 hours
TEOS homo-polymerization time=0.25 hour As shown in Table 1 below, the cadmium uptake capacity increases rapidly until the ratio [TEA]/[Si]$_t$=0.0353 and decreases again. The surface area and average pore diameter continue to increase as [TEA]/[Si]$_t$ increases within the range of [TEA]/[Si]$_t$ of this investigation.

TABLE 1

Effect of TEA Concentration on Cadmium Uptake and Pore Characteristics

| [TEA]/[Si]$_t$ | $q_{Cd}$ (mg/g) | BET Measurement S.A. (m²/g) | D (Å) |
|---|---|---|---|
| 0.0076 | 56.5 | 247.6 | 27.6 |
| 0.0151 | 163.2 | 379.1 | 28.4 |
| 0.0353 | 172.0 | 340.3 | 34.3 |
| 0.0757 | 116.8 | 415.7 | 36.9 |

Each of a second series of similarly treated gels was formed using the following specifications:

MPS:EtOH:H$_2$O:HCl=1:3:3:0.011
TEOS:EtOH:H$_2$O:HCl=1:4:4:0.006
MPS homo-polymerization time=3 hours
TEOS homo-polymerization time=0.25 hour
[TEA]/[Si]$_t$=0.353

As shown in Table 2 below, the cadmium uptake capacity increases as TEOS:MPS ratio increases up to about 2 and then decreases with increasing ratio. The BET surface area of the adsorbent continues to increase as the ratio of TEOS/MPS increases while the average pore diameter decreases.

TABLE 2

Effect of TEOS/MPS Concentration on Cadmium Uptake and Pore Characteristics

| TEOS/MPS | $q_{Cd}$ (mg/g) | BET Measurement S.A. (m²/g) | D (Å) |
|---|---|---|---|
| 0.50 | 3.8 | — | — |
| 1.00 | 76.4 | 62.5 | 67.1 |
| 1.25 | 84.7 | 88.7 | 49.9 |
| 1.50 | 120.7 | 163.3 | 40.7 |
| 1.75 | 148.5 | 238.0 | 35.0 |
| 2.00 | 171.0 | 286.2 | 33.6 |
| 2.50 | 157.9 | 431.0 | 29.3 |
| 3.00 | 153.5 | 466.5 | 29.2 |

Example 3

Effect of TEOS and MPS Homo-polymerization Times on Cadmium Uptake

Using different series of similarly treated composite materials obtained from Example 1, the effects of TEOS and MPS homo-polymerization on cadmium uptake was determined as described in Example 2.

Each of a first series of similarly treated gels was formed using the following specifications:

MPS:TEOS=1:2
MPS:EtOH:H$_2$O:HCl=1:3:3:0.011
TEOS:EtOH:H$_2$O:HCl=1:4:4:0.006
TEOS homo-polymerization time=0.25 hour
[TEA]/[Si]$_t$=0.353

The cadmium uptake capacity is at maximum when the MPS is homo-polymerized for about 3 hours as shown in Table 3 below.

TABLE 3

Effect of MPS Homo-polymerization Time on Cadmium Uptake

| Reaction Time (hour) | $q_{Cd}$ (mg/g) |
|---|---|
| 0.5 | 127.7 |
| 1.0 | 139.5 |
| 2.0 | 138.1 |
| 3.0 | 165.0 |
| 4.0 | 125.7 |

Each of a second series of similarly treated gels was formed using the following specifications:

MPS:TEOS=1:2
MPS:EtOH:H$_2$O:HCl=1:3:3:0.011
TEOS:EtOH:H$_2$O:HCl=1:4:4:0.006
MPS homo-polymerization time=3.0 hours
[TEA]/[Si]$_t$=0.353

However, the homo-polymerization time of TEOS has minor effect on the cadmium uptake capacity as shown in Table 4.

TABLE 4

Effect of TEOS Homo-polymerization Time on Cadmium Uptake

| Reaction Time (hour) | $q_{Cd}$ (mg/g) |
|---|---|
| 0.25 | 169.9 |
| 0.5 | 163.6 |
| 1.0 | 165.4 |
| 2.0 | 174.4 |
| 3.0 | 170.2 |
| 5.0 | 173.8 |

Example 4

Degree of MPS Homo-polymerization

MPS self-condensation was conducted as described in Example I except for the addition of chromium acetyacetone of (Cr(acac)$_3$) to 0.01M in solution as a relaxation agent. After initiation of hydrolysis and self-condensation, 2.7 ml aliquots were taken from the reaction mixture and placed into 10 ml NMR tubes at various reaction times from 15 minutes to four hours. Since the hydrolysis and self-condensation reactions occur fairly quickly, samples were immediately quenched in acetone and dry ice solution at −85° C. and stored until NMR spectra were taken.

The $^{29}$Si-NMR analysis was performed to determine the degree of condensation of the functional precursor silane MPS. NMR analyses were taken using a 300 MHz NMR spectrometer (AMX-300, Bruker). To prepare samples for analysis, 0.3 ml denatured ethanol and 0.05 ml tetramethysilane are added to each sample as an internal standard. The NMR spectra are taken at −50° C. until the required signal to noise ratio is satisfied. Further details of the NMR analytical procedure are reported in Boonstra et al., *J. Non-Cryst Solids* 108:249-259 (1989), which is hereby incorporated by reference.

As shown in FIGS. 3A and 3B, the length of the self-condensation reaction time significantly affects the degree of homopolymerization. MPS rapidly self-condenses to form dimers (T$_1$) containing a single Si—O—Si bond formation, with MPS dimers reaching maximum concentration (~80%) after about 10 minutes. As the self-condensation reaction continues, MPS monomers (T$_0$) are consumed and MPS trimers (T$_2$) eventually become the most prevalent species of oligomer after about 90 minutes. As indicated in Example 3 with respect to $Cd^{2+}$ uptake capacity, maximum efficacy of the resulting organo-ceramic composite material was achieved following about 3 hours of MPS self-condensation. At 3 hours, the MPS trimers and dimers were the most prevalent species, and more complex oligomers ($T_3$ and $T_A$) were present at much lower concentrations.

On the basis of these results, it is generally believed that optimum metal ion adsorption can be achieved by maximizing the concentration of certain homo-polymerized oligomers resulting from the self-condensation reaction of the functional precursor silane.

Example 5

Preparation of Organo-Ceramic Composite Materials Having a Propyl/Thio Functional Moiety Using Synthesis Scheme 1 with Alkali Salt A series of organo-ceramic composite materials having a propyl/thio functional moiety were synthesized as described in Example 1, except for the addition of sodium chloride to the both MPS and TEOS homo-polymerization solutions. The sodium chloride was introduced into each of those solutions at a sodium to silicon molar ratio of 0.1-0.0001:1.

The synthesized material was crushed as described in Example 1, then washed with 50 ml of water several times to remove sodium chloride from the gel and finally with 50 ml of acetone. After washing, the material was dried overnight in an 80° C. oven.

Example 6

Effect of Sodium Chloride Presence During TEOS and MPS Homo-polymerization on Cadmium Uptake Using a series of similarly treated composite materials obtained from Example 5, the effects of sodium chloride presence during TEOS and MPS homo-polymerization on cadmium uptake was determined as described in Example 2.

Each of a first series of similarly treated gels was formed using the following specifications:
MPS:TEOS=1:2
MPS:EtOH:$H_2O$:HCl=1:3:3:0.011
TEOS:EtOH:$H_2O$:HCl=1:4:4:0.006
MPS homo-polymerization time=3.0 hours
TEOS homo-polymerization time=0.25 hour
$[TEA]/[Si]_t$=0.353

As shown in Table 5 below, the cadmium uptake capacity increases as the concentration of sodium chloride increases until $[NaCl]/[Si]_t$ is about 0.01, after which it decreases. When $[NaCl]/[Si]_t$=0.1, sodium chloride precipitates in the solution because of solubility limits.

TABLE 5

Effect of NaCl During Homo-polymerization on Cadmium Uptake

| $[NaCl]/[Si]_t$ | $q_{Cd}$ (mg/g) |
|---|---|
| 0.0001 | 175.8 |
| 0.001 | 179.4 |
| 0.01 | 194.2 |
| 0.1 | 188.5 |

The BET surface area and average pore diameter when $[NaCl]/[Si]_t$=0.01 is 360.6 $m^2$/gm and 34.3 Å, respectively.

Example 7

Preparation of Organo-Ceramic Composite Materials Having a Propyl/Thio Functional Moiety Using Synthesis Scheme 1 with Alkali Salt and Hydro-thermal Treatment of Synthesized Gel A series of organo-ceramic composite materials having a propyl/thio functional moiety were synthesized according to Synthesis Scheme 1.

MPS was homo-polymerized using the following materials:
4.97 ml (25 mmol), MPS;
4.38 ml (75 mmol), ethanol; and
1.35 ml (75 mmol) of 0.2 mol/L HCl.

The ratio of MPS:EtOH:$H_2O$:HCl was 1:3:3:0.0108. Sodium chloride was added at a Na:Si molar ratio of about 0.01:1. The MPS solution was homo-polymerized for 3 hours.

TEOS was homo-polymerized using varying amount of the following materials:
11.73 ml (50 mmol), TEOS;
11.68 ml (200 mmol), ethanol; and
3.6 ml (200 mmol) of 0.083 mol/L of HCl solution.

The molar ratio of TEOS:EtOH:$H_2O$:HCl was 1:4:4:0.006. Sodium chloride was added at a Na:Si molar ratio of about 0.01:1. The TEOS solution was homo-polymerized for 15 minutes.

After the indicated homo-polymerization times, the MPS homo-polymer solution was mixed with the TEOS homo-polymer solution, allowing hydrolysis and co-condensation to occur. The molar ratio of MPS:TEOS was 1:2. Co-condensation was allowed to occur for approximately 2 minutes, at which time a volume of 0.394 ml (2.83 mmol) of TEA was used to initiate gelation. The material was aged for 30 minutes at 25° C. after gelation.

Subsequent to aging, hydro-thermal treatment was used to enhance the metal uptake capacity and to increase the pore size of the composite material. The hydro-thermal treatment was carried out by heating the gel to 60° C. in 50 ml of a 50 v/v % water and acetone solution for 15 hours. The gel was then filtered and placed in 50 ml of pure acetone and heated to 60° C. The acetone was replaced 5 times in 24 hours to extract water from the gel pores. The resulting material was filtered and dried at 80° C. in an oven for 24 hours.

The synthesized material was crushed, washed, and stored as described in Example 1.

The BET surface area and average pore diameter are 639.93 $m^2$/gm and 81.7 Å, respectively.

Example 8

Recovery of Cadmium from Solution

The composite material prepared in Example 7 was tested for cadmium uptake capacity as described in Example 2. The measured cadmium uptake capacity was 222.3±1.2 mg/gm.

Figure 5:
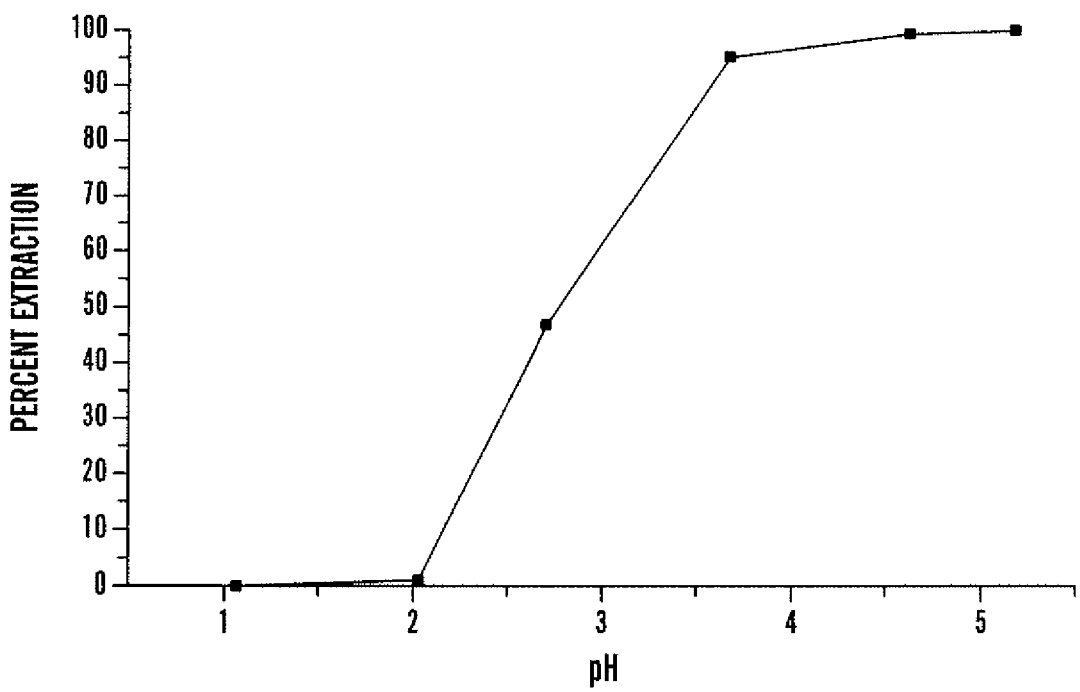
FIG. 5 is a graph illustrating the pH dependency of cadmium adsorption by a composite material of the present invention which contains a propyl/thio functional moiety.

The effect of the pH of aqueous cadmium solutions on the adsorption of cadmium ion is shown in FIG. 5. Using 0.5 g of the composite material of Example 7 as an adsorbent, the adsorbent was placed in 100 ml solution containing an initial cadmium concentration of ($C_0$) of 385 mg/l. Nearly complete cadmium extraction was achieved at a pH of 5.

Figure 6:
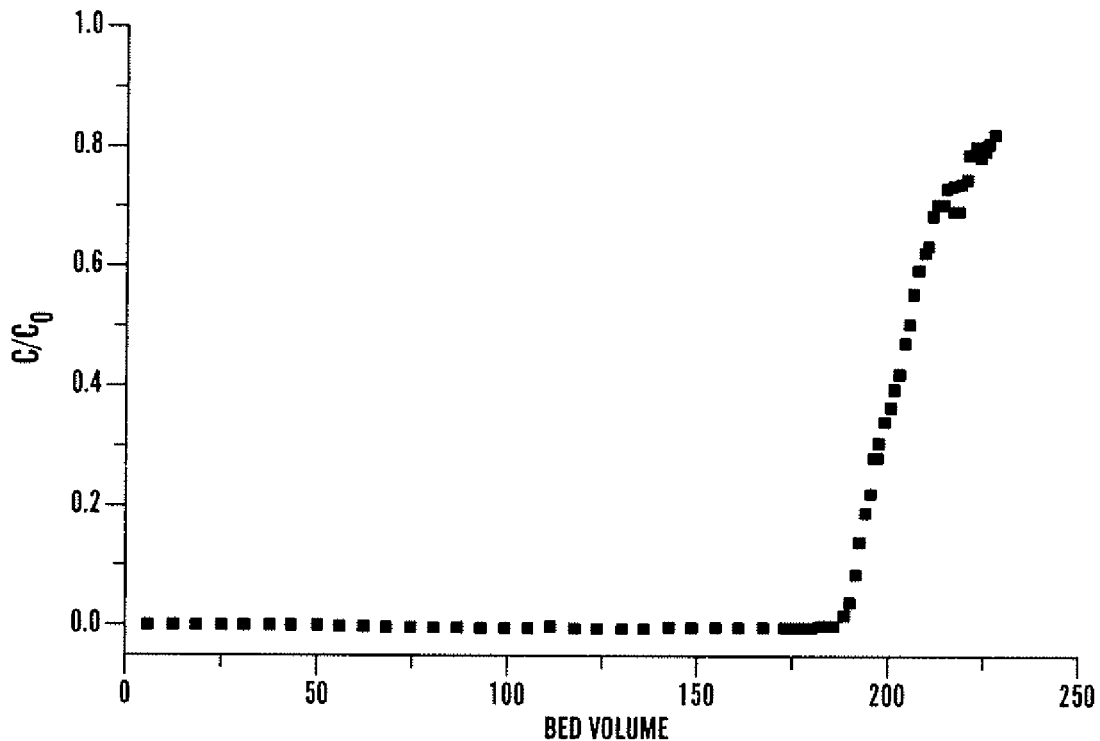
FIG. 6 is the breakthrough curve for cadmium adsorption in a column containing a composite material which contains a propyl/thio functional moiety as used in FIG. 5.
Figure 7:
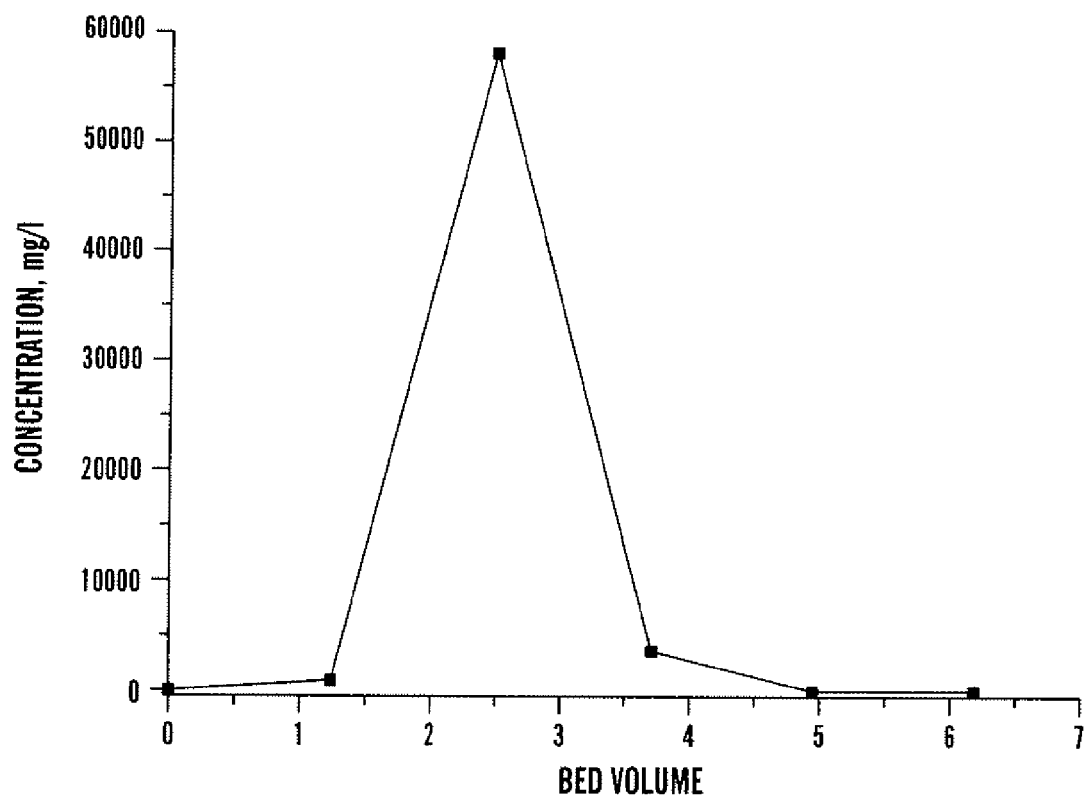
FIG. 7 is the elution curve for cadmium adsorption by a composite material of the present invention containing a propyl/thio functional moiety.

The breakthrough curve and the elution curve are shown in FIGS. 6 and 7, respectively. Using the composite material of Example 7 as an adsorbent, an 8.56 cm³ bed volume of the composite material was inserted into a column and a cadmium solution, pH 4.6, having a cadmium concentration ($C_0$) of 388.2 mg/l was run through the column. The breakthrough capacity was calculated as 146 mg/g (Caq<0.1 ppm) and the total adsorbed amount of cadmium ($C/C_0$=0.82) was 169 mg/g. The elution curve illustrates the degree of cadmium recovery from the composite material used as an adsorbent in measuring the breakthrough curve. Using a flow rate of 1.1 ml/min with 1.0 M HCl, cadmium recovery was 92%.

Example 9

Recovery of Mercury from Solution

The composite material prepared in Example 7 was tested for mercury uptake capacity by equilibrating 0.5 g of the composite material with 2L of 600 mg/L mercury solution for 24 hours with agitation. The initial mercury solution is buffered with 0.02 mol/L sodium acetate at pH 5. The concentration of mercury is determined by means of a cold vapor mercury analyzer. The mercury uptake capacity was measured as 1284±17 mg/g at pH=5.0 and approximately 1070 mg/g at pH=3.0.

Figure 8:
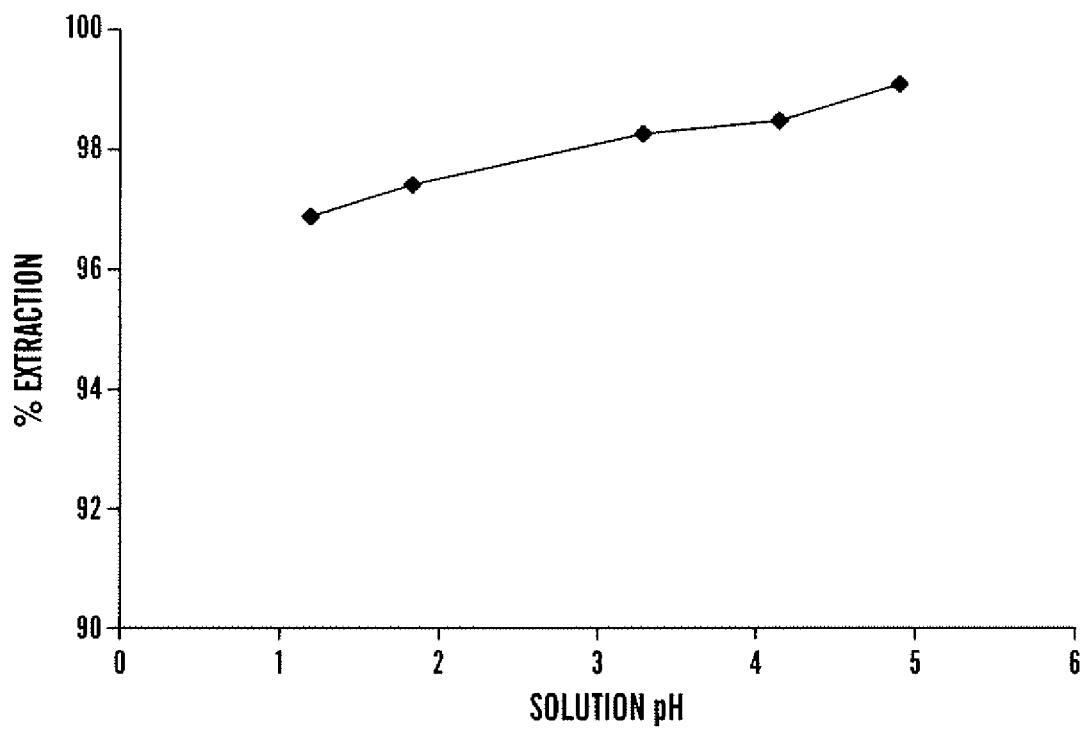
FIG. 8 is a graph illustrating the pH dependency of mercury adsorption by a composite material of the present invention which contains a propyl/thio functional moiety.

The effect of the pH of aqueous mercury solutions on the adsorption of mercury ion is shown in FIG. 8. Using 0.5 g of the composite material of Example 7 as an adsorbent, the adsorbent was placed in 200 ml solution containing an initial mercury concentration of ($C_0$) of 500 mg/l. Nearly complete (>99%) mercury extraction was achieved at a pH of about 5.0.

Figure 9:
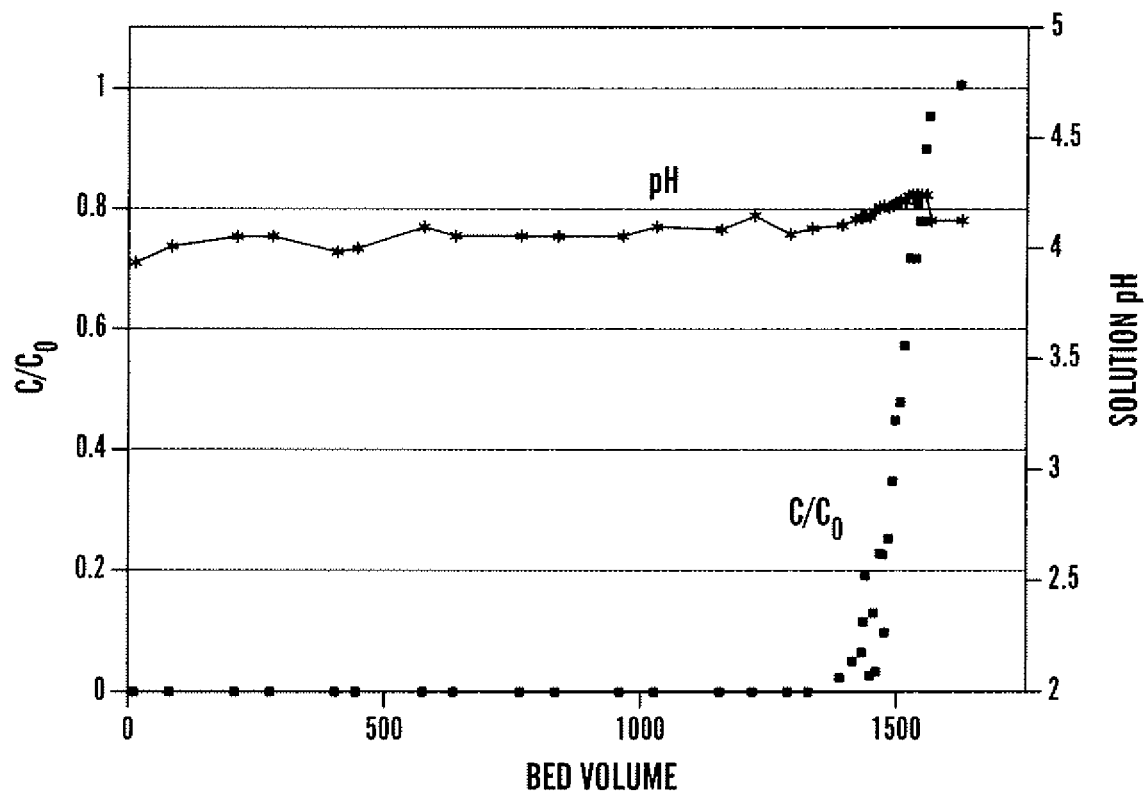
FIG. 9 is the breakthrough curve for mercury adsorption in a column containing a composite material which contains a propyl/thio functional moiety as used in FIG. 8.
Figure 10:
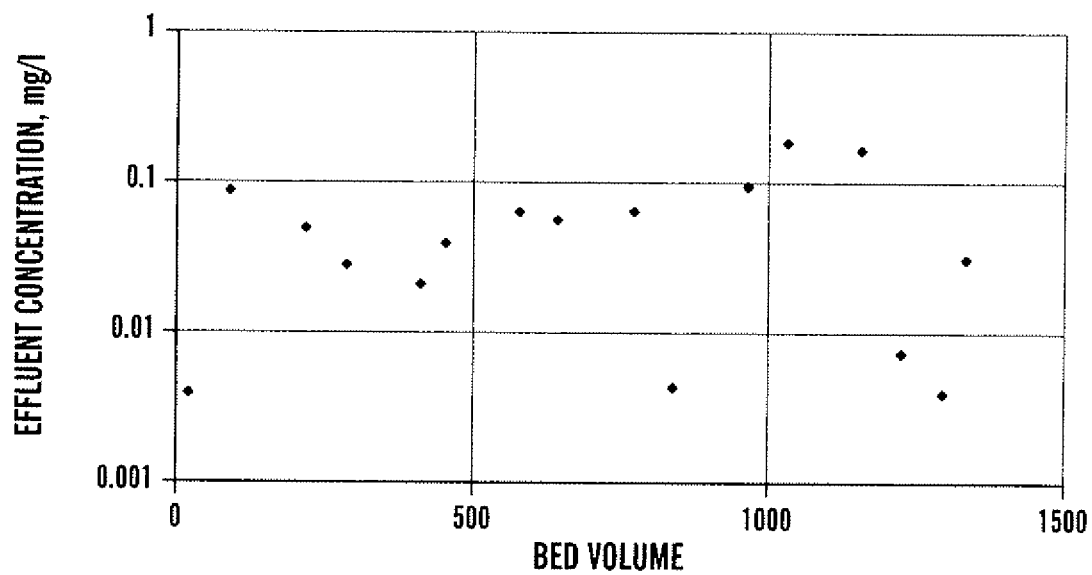
FIG. 10 is the effluent mercury concentration at greater resolution for the experiment of FIG. 9 prior to the breakthrough.
Figure 11:
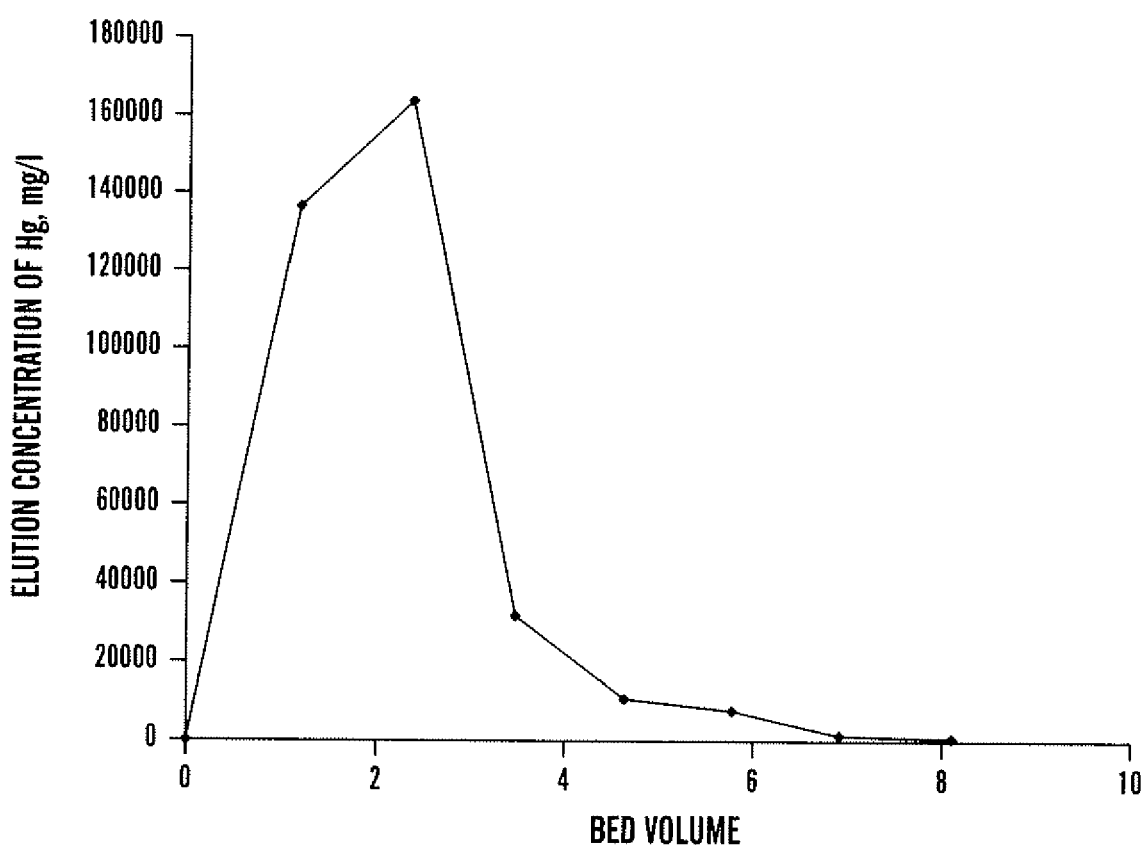
FIG. 11 is the elution curve for the adsorbed mercury from the experiment of FIG. 9.

The breakthrough curve and the elution curve are shown in FIGS. 9 and 11, respectively. Using the composite material of Example 7 as an adsorbent, a 8.65 cm³ bed volume of the composite material was inserted into a column and a mercury solution, pH 4.0, having a mercury concentration ($C_0$) of 266 mg/l was run through the column. The breakthrough capacity was calculated as 824 mg/g (Caq<0.1 ppm) and the total adsorbed amount of mercury ($C/C_0$=1.0) was 844 mg/g. As shown in FIG. 9, more than 12 liters of the 266 mg/l mercury solution could be treated by the 8.65 cm³ bed volume of composite material, which is approximately 4 g. The concentration of mercury in effluent prior to breakthrough was generally between about 10 μg/l to about 100 μg/l. (FIG. 10).

The elution curve (FIG. 11) illustrates the degree of mercury recovery from the composite material. Using a flow rate of 1.1 ml/min with 12.1 M HCl, mercury recovery was 99.6%. Hence, mercury in more than 12 liters of 266 mg/l mercury solution can be concentrated in less than about 60 ml solution.

Example 10

Selectivity of Organo-Ceramic Composite Material Having a Propyl/Thio Functional Moiety Using the organo-ceramic composite material of Example 7, the affinity of this composite material for several different metal ions was determined. A metal ion solution was prepared containing 0.36 mmol/l total metal ions. Specifically, the solution contained 0.072 mmol/l of each of the following: $Cu^{2+}$, $Cd^{2+}$, $Pb^{2+}$, $Zn^{2+}$, and $Ni^{2+}$.

Approximately 1.0 g of the composite material was allowed to equilibrate with 1000 ml of the metal ion solution for 24 hours. Percent extraction was determined by measuring the amount of metal ion remaining in solution following exposure to the composite material. The results are shown in Table 6 below.

TABLE 6

Metal Ion Selectivity for Propyl/Thio Composite

| Metal Ion | Percent Extraction |
| --- | --- |
| $Cu^{2+}$ | 98.9 |
| $Cd^{2+}$ | 92.7 |
| $Pb^{2+}$ | 57.5 |
| $Zn^{2+}$ | 2.0 |
| $Ni^{2+}$ | 0.0 |

In addition to the high adsorbence of cadmium and mercury ions demonstrated in Examples 8 and 9, the propylthio organo-ceramic composite material also exhibits high adsorbence of copper ions, moderate adsorbence of lead ions, and minimal adsorbence of zinc ions. No adsorbence of nickel ions was detected. Thus, this composite material of the present invention can be used to adsorb several different metal ions.

Example 11

Preparation of Organo-Ceramic Composite Materials Having a Dihydroimidazole Functional Moiety Using Scheme 2 in Acidic Solution A series of composite materials having a dihydroimidazole functional group were prepared according to Synthesis Scheme 2. The functional precursor silane was (N-(3-triethoxysilylpropyl)-4,5-dihydroimidazole) ("IPS"). Since imidazole is a weak base (pKa≧7) in nature, it is possible to use a strong acid to lower the solution pH if hydrolysis of the precursor in an acidic solution is desired. The IPS solution contained the following components:

5.5 ml (20.1 mmol), IPS;
3.5 ml (60.3 mmol), ethanol; and
2.54-3.27 ml (141.2-181.8 mmol) of 8.66-6.73 mol/L HCl solution.

The molar ratio of IPS:ethanol:$H_2O$:HCl was 1:3:7-9:1.1.

The IPS solution was hydrolyzed and homo-polymerized for varying amounts of time between 15 minutes and 3 hours.

The cross-linking silane was TEOS, which was prepared as a solution containing 9.0 ml (40.2 mmol) TEOS and 9.4 ml (160.8 mmol) of ethanol. The molar ratio of IPS:TEOS was 1:2. The TEOS solution was added to the homo-polymerized IPS solution at the desired time and then co-polymerized for between 15 minutes and 5.5 hours. Following the desired co-polymerization time, an amount of TEA (where [TEA]/[Si]$_t$=0.18-1.08) was used to induce gelation. After gelation, the materials were aged for 24 hours at 25° C. and then dried in 80° C. oven.

The synthesized materials were crushed, washed, and stored as described in Example 1.

Example 12

Effect of TEA Concentration and Co-condensation Time on Proton Uptake Capacity for Composite Materials Having Dihydroimidazole Functional Moiety A series of composite materials synthesized in Example 11 were utilized to determine the effect of TEA concentration on proton uptake capacity. Composite materials having the following properties were utilized:

IPS:TEOS=1:2
IPS:EtOH:H$_2$O:HCl=1:3:7:1.1
TEOS:EtOH:H$_2$O:HCl=1:4:0:0
IPS homo-polymerization time=0.25 hour
Mixing time of homo-polymerized IPS and TEOS=0.5 hour Proton uptake capacity was determined by equilibrating 0.3 gram of the synthesized adsorbent with 25 ml of 0.1045 mol/L HCl standard solution for 24 hours at 25° C. water bath while shaking. After equilibration, 10 ml of solution was filtered and titrated with 0.1 mol/L NaOH standard solution. The effect of the ratio [TEA]/[Si]$_t$ on the proton uptake capacity of the adsorbent is shown in Table 7 below.

TABLE 7

Effect of [TEA]/[Si]$_t$ on Proton Uptake Capacity

| [TEA]/[Si]$_t$ | q$_{H+}$ (mmol/g) |
|---|---|
| 0.18 | 2.68 |
| 0.54 | 2.92 |
| 0.72 | 2.94 |
| 0.90 | 2.89 |
| 1.08 | 2.92 |

The effect of the co-condensation time between the homo-polymerized IPS and the TEOS solution on proton uptake is shown in Table 8 below.

TABLE 8

Effect of Co-condensation Time on Proton Uptake Capacity

| Co-condensation Time (hours) | q$_{H+}$ (mmol/g) |
|---|---|
| 0.25 | 2.48 |
| 0.5 | 2.71 |
| 1.5 | 2.75 |
| 3.0 | 2.66 |
| 5.5 | 2.64 |

Maximum proton uptake occurred following co-condensation times of between about 30 minutes and 1.5 hours.

Example 13

Preparation of Organo-Ceramic Composite Materials Having a Dihydroimidazole Functional Moiety Using Scheme 2 and Hydro-thermal Treatment of Gel A series of composite materials having a dihydroimidazole functional moiety were prepared using synthesis scheme 2 followed by hydro-thermal treatment of the resulting gel. The IPS solution contained the following components:
5.5 ml (20.1 mmol), IPS;
3.5 ml (60.3 mmol), ethanol; and
2.54 ml (141.2 mmol) of 8.66 mol/L of HCl solution.

The molar ratio of IPS:ethanol:water:acid was 1:3:7:1.1. After hydrolysis and homo-polymerization of the IPS solution for 15 minutes, a diluted TEOS solution containing 9.0 ml (40.2 mmol) of TEOS and 9.4 ml (160.8 mmol) of ethanol was added to the homo-polymerized IPS solution and co-condensed for 30 minutes. Following co-condensation, 4.45 ml of TEA was introduced to form the gel. The gel was aged at 25° C. for 24 hours and then transferred into a 250 ml flask to which 100 ml of acetone is added to extract the water in the silica pore network. After acetone addition, the flask is mounted on a 60° C. water bath while refluxing the solution. Acetone is replaced 5 times in the following 24 hours. The material was filtered and dried overnight at 60° C. in an oven.

The synthesized material is crushed, washed, and stored as described in Example 1.

Example 14

Effect of Hydro-thermal Treatment on Palladium Chloride Uptake Capacity

Composite materials from Example 11 and Example 13 were used to determine palladium chloride uptake capacity and the effect of hydro-thermal treatment on the uptake capacity of gels.

The composite material from Example 11 had the following properties:
IPS:TEOS=1:2
IPS:EtOH:H$_2$O:HCl=1:3:7:1.1
TEOS:EtOH:H$_2$O:HCl=1:4:0:0
IPS homo-polymerization time=15 minutes
Co-condensation time=30 minutes
[TEA]/[Si]$_t$=0.54

The composite material from Example 13 had the following properties:
IPS:TEOS=1:2
IPS:EtOH:H$_2$O:HCl=1:3:7:1.1
TEOS:EtOH:H$_2$O:HCl=1:4:0:0
IPS homo-polymerization time=15 minutes
Co-condensation time=30 minutes
[TEA]/[Si]$_t$=0.54

Palladium chloride (PdCl$_4^{2-}$) uptake capacity was determined by equilibrating 0.25 gram of the adsorbent with 100 ml of 2,000 mg/L Pd(II) solution containing 0.5 mol/L Cl$^-$, 0.03 mol/L K$^+$, and 0.07 mol/L H$^+$. Palladium chloride uptake capacity of the material from Examples 11 and 13 were 170 mg/gm and 185.2 mg/gm, respectively. This shows a slight increase in palladium chloride uptake when a hydro-thermal treatment is used.

Example 15

Preparation of Organo-Ceramic Composite Materials Having a Dihydroimidazole Functional Moiety Using Scheme 1 in Basic Solution In contrast to Examples 11 and 13, no acid is used to initiate hydrolysis of the precursor silane. Since imidazole is a conjugate base, it acts as a self-catalyst in an alcohol/water mixture for the hydrolysis and self-condensation of the precursor silane. Hence, the hydrolysis of the precursor silane is virtually base catalyzed.

A series of composite materials having a dihydroimidazole functional group were prepared according to Synthesis Scheme 1. The functional precursor silane was IPS. The IPS solution contained the following components:
5.5 ml (20.1 mmol), IPS;
3.5 ml (60.3 mmol), ethanol; and
0.181-0.724 ml (10.05 40.2 mmol) of water The molar ratio of IPS:ethanol:H$_2$O was 1:3:0.5-2.0. The IPS solution was hydrolyzed and homo-polymerized for varying amounts of time between 15 minutes and 3 hours.

The cross-linking silane was TEOS, which was homo-polymerized using varying amounts of the following materials:
9.0 ml (40.2 mmol), TEOS;
9.4 ml (160.8 mmol), ethanol, and 0.362 ml (20.1 mmol)-1.086 ml (60.3 mmol) of 0.5 M HCl solution.

The molar ratio of TEOS:EtOH:H$_2$O:HCl was 1:4:0.5-1.5: 0.0045-0.0135. The homo-polymerization time of TEOS was 30 minutes. The molar ratio of IPS:TEOS was 1:2.

After the indicated homo-polymerization times, the self-condensed IPS solutions were mixed with the partially self-condensed TEOS solutions, allowing hydrolysis and co-condensation to occur for approximately 1 minute to 5 minutes, at which time varying amounts (2.725 ml-2.182 ml) of water were introduced ([Si]$_t$/[H$_2$O]$_t$=1:10) to the co-condendensation solution to form the gels. The gel materials were aged at 25° C. for 24 hours and dried at 80° C. in an oven for 24 hours.

The synthesized materials were crushed, washed, and stored as described in Example 1.

Example 16

Preparation of Organo-Ceramic Composite Materials Having a Dihydroimidazole Functional Moiety Using Synthesis Scheme 1 with Alkali Salt and Hydro-thermal Treatment of Synthesized Gel A series of organo-ceramic composite materials having a dihydroimidazole functional moiety were synthesized according to Synthesis Scheme 1.

IPS was homo-polymerized using the following materials:
5.5 ml (20.1 mmol), IPS;
3.5 ml (60.3 mmol), ethanol; and
0.362 ml (20.1 mmol) of water.

The molar ratio of IPS:EtOH:H$_2$O was 1:3:1. Sodium fluoride was added at Na:IPS molar ratio of about 0.000061-0.00048:1 and four preparations were made over this range of ratios. It is noted that the NaF can be added to the TEOS homo-polymerization solution, if desired, as in Example 5, where NaCl was used as an alternative to NaF. The IPS solution was homo-polymerized for 30 minutes.

TEOS was homo-polymerized using varying amounts of the following materials:
9.0 ml (40.2 mmol), TEOS;
9.4 ml (160.8 mmol), ethanol; and
0.724 ml (40.2 mmol) of 0.5 M HCl solution.

The molar ratio of TEOS:EtOH:H$_2$O:HCl was 1:4:1:0.009. The TEOS solution was homo-polymerized for 30 minutes.

After the indicated homo-polymerization times, the IPS homo-polymer solution was mixed with the TEOS homo-polymer solution, allowing hydrolysis and co-condensation to occur for approximately 1-2 minutes, at which time a volume of 2.182 ml (121.32 mmol) of water was added to the solution. After gelation, the materials were aged at 25° C. for 24 hours and then dried in 80° C. oven.

The synthesized materials were crushed, washed, and stored as described in Example 1.

The Pd(II) uptake capacity for the four materials ranged from 134.9 mg/g to 162.8 mg/g with the largest value of 162.8 mg/g occurring at [NaF]/[IPS] ratio of 0.000242.

Example 17

Effect of Hydrothermal Treatment on Palladium Uptake Capacity

With one of the chemical compositions given in Example 16, a dihydroimidazole composite material was synthesized using hydrothermal treatment to demonstrate the effects of the hydro-thermal process on metal uptake and pore characteristics.

IPS was homo-polymerized using the following materials:
5.5 ml (20.1 mmol), IPS;
3.5 ml (60.3 mmol), ethanol; and
0.362 ml (20.1 mmol) of water.

Sodium fluoride was added at Na:Si molar ratio of about 0.00048:1.

TEOS was homo-polymerized using varying amounts of the following materials:
9.0 ml (40.2 mmol), TEOS;
9.4 ml (160.8 mmol), ethanol; and
0.724 ml (40.2 mmol) of 0.5 M HCl solution.

The remaining procedures used in Example 16 were repeated through the gellation of the material. After gelation, the composite material was hydro-thermally treated as described in Example 7.

The hydro-thermally treated material showed a lower palladium uptake capacity when compared to the non-hydrothermally treated material, 128.2 mg/g versus 145.5 mg/g. However, the pore characteristics of the hydro-thermally treated material were greatly improved. The non-hydrothermally treated material had non-measurable average pore diameter by nitrogen adsorption and BET surface area. However, the hydrothermally treated material had an average pore diameter of 56.8 Å and BET surface area of about 357 m$^2$/g.

Example 18

Extraction of Noble Metal Ions from HCl and Cyanide Solutions

An organo-ceramic composite adsorbent containing dihydroimidazole functional moiety was synthesized with the same procedures and chemical molar ratios as described in Example 16 with [NaF]/[IPS]$_t$=0.0049 for the hydrolysis and homo-condensation of IPS. No hydrothermal treatment was applied.

The synthesized composite material was characterized for the adsorptions of palladium, platinum, and gold chlorides from HCl solutions.

Figure 12:
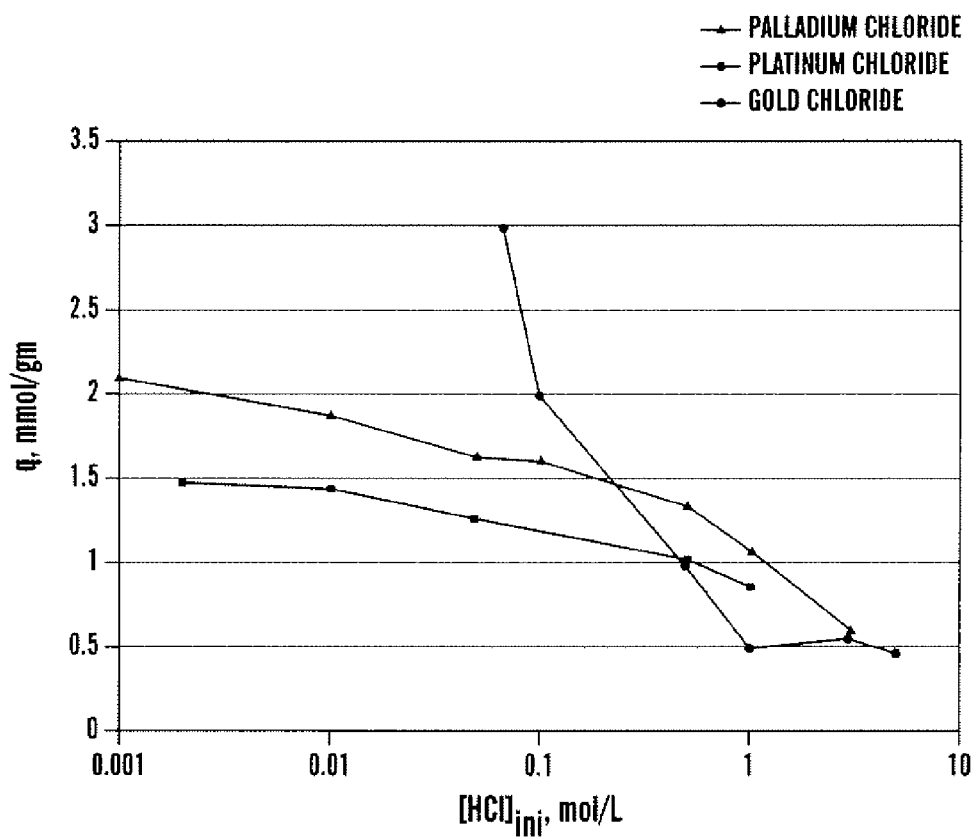
FIG. 12 is a composite of pH isotherms for palladium, platinum, and gold chlorides in HCl solutions using a composite material containing an imidazole functional moiety.

One hundred ml volume solutions each containing 10 mmol/L of palladium and platinum chlorides at various HCl concentrations were equilibrated with 0.25 g of the adsorbent. For gold chloride, 150 ml of 5.9 mmol/L gold solutions at various HCl concentrations were contacted with 0.1 g of the adsorbent. The metal uptake capacities of palladium, platinum, and gold chlorides on the adsorbent at various HCl concentrations are shown FIG. 12. Palladium chloride uptake was higher than platinum uptake capacity over the examined HCl concentration range Gold chloride is adsorbed mostly at lower HCl concentrations, however, the gold uptake capacity rapidly decreases as HCl concentration increases.

Figure 13:
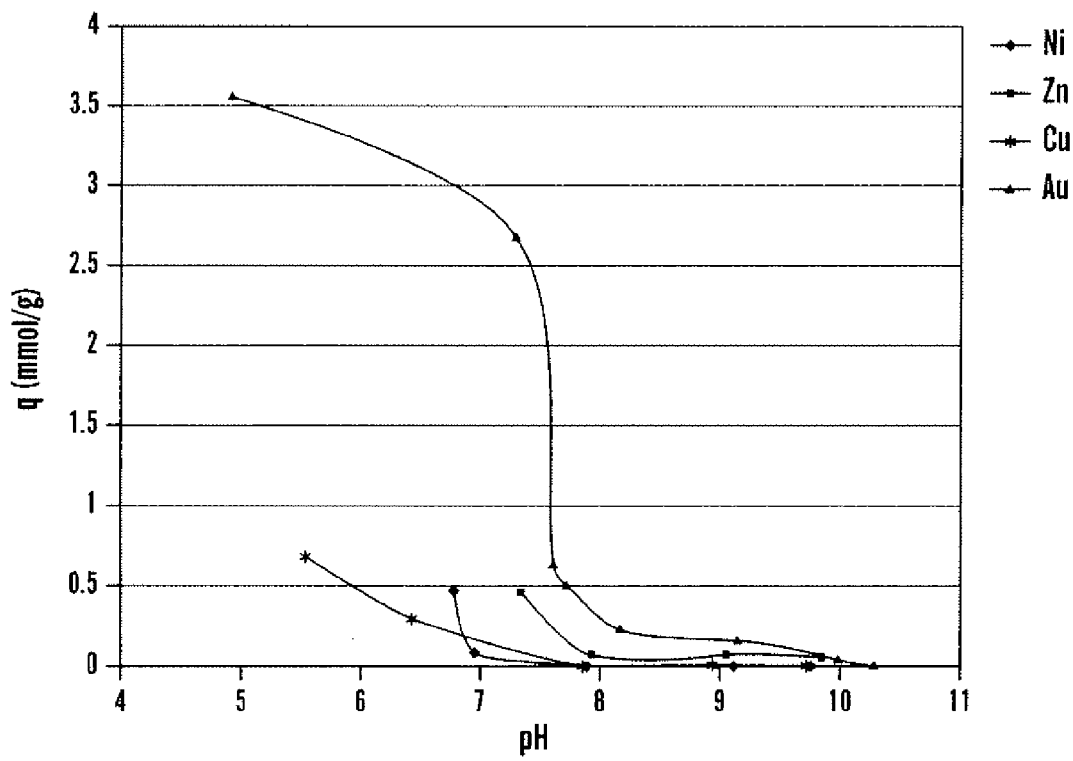
FIG. 13 is a composite of pH isotherms of gold, zinc, nickel, and copper cyanides using a composite material containing an imidazole functional moiety.

In addition to these metal chlorides, 0.25 g of the adsorbent was contacted with 100 ml of approximately 10 mmol/L of copper and iron solutions at various HCl concentrations. Negligible copper and iron uptake were detected over the HCl concentration range from 0.1 mol/L to 5.0 mol/L pH isotherms of the adsorbent for gold, nickel, zinc, and copper cyanides in cyanide solutions are also made to show selective separation of gold, as shown in FIG. 13. For gold cyanide pH isotherms, 100 ml of approximately 8 mmol/L gold solutions at gold cyanide to free cyanide (CN$^-$) ratio 1 to 5 and at various solution pH values are equilibrated with 0.1 g of the adsorbent. For pH isotherms of other metal cyanides, 50 ml of approximately 14 mmol/L metal cyanide solutions at metal cyanide to free cyanide ratio 1 to 5 and at various solution pH values are equilibrated with 0.125 g of the adsorbent. Under the given experimental condition, the adsorbent has selectivity in the order of gold>zinc>nickel>copper.

Figure 14:
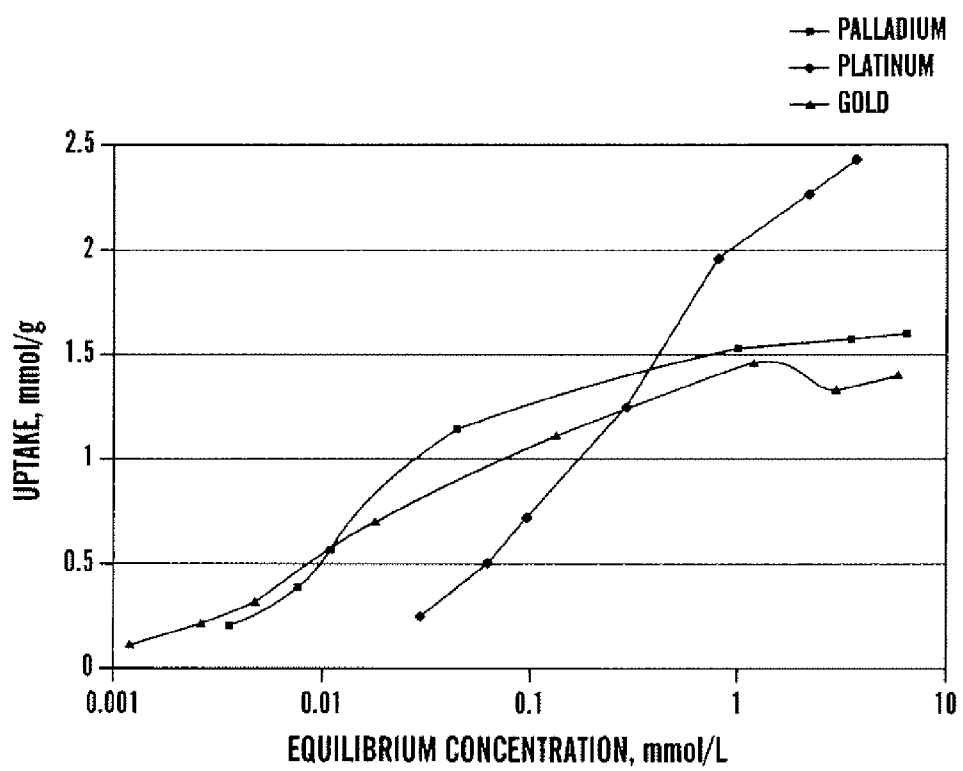
FIG. 14 is a composite of palladium, platinum, and gold chloride uptake capacities for a composite material containing an imidazole functional moiety.

Adsorption isotherms for palladium, platinum, and gold chlorides are shown in FIG. 14. For palladium and platinum chlorides, 0.25 g of the adsorbent was placed in 100 ml of solution containing various concentrations of the metal chlorides at 0.1 M HCl concentration. For gold chloride, 0.1 g of the adsorbent and 150 ml of gold chloride solutions at 0.1 M HCl concentration was used. As shown in FIG. 14, the adsorbent has higher selectivity for palladium chloride over platinum and gold chlorides at the metal concentrations lower than 0.25 mmol/L.

Example 19

Synthesis of Functional Precursor Silane Containing Pyrazole Functional Moiety Since pyrazole modified trialkoxysilane is not available commercially, the functional precursor N-trimethoxysilylpropylpyrazole ("PzPs") was synthesized as follows.

The precursor is synthesized by alkylation of pyrazole with 3-chloropropyltrimethoxysilane in organic base solutions as shown in synthesis scheme below.

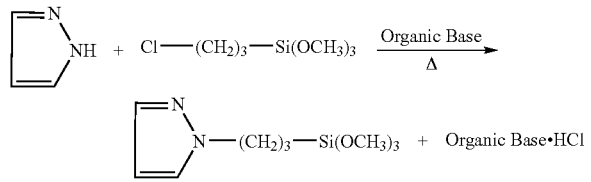

In particular, 1 molar unit of pyrazole is dissolved in a mixture of 1 molar unit of an organic base and 1 molar unit of 3-chloropropyltrimethoxysilane. Organic bases used in the synthesis can be either triethylamine or di-isopropyl-ethylamine. Even though the conversion is slightly lower using di-isopropyl-ethylamine, it is preferred because it produces no byproducts such as quaternary amines. The mixture is heated to 120-130° C. while refluxing the solution for 6 hours to 24 hours. The product is then separated from the crude reaction mixture first by filtration of organic base and hydrogen chloride salts and subsequently by fractional distillation of the filtered solution under vacuum. The total yield is 74.4% and the density of product is 1.04 g/cm$^3$. The purified product was analyzed by using GC-MS (HP Model 5971 with HP Model 5890 GC), IR (Nicolet IMPACT 400), and $^1$H and $^{13}$C-NMR (Bruker-300 MHz), which confirmed its identity.

Example 20

Preparation of Composite Material Having Pyrazole Functional Moiety

Synthesis scheme 1 is adapted as the synthesis route for an organo-ceramic composite adsorbent containing pyrazole moiety.

A series of organo-ceramic composite materials containing pyrazole moiety was synthesized with various homo-condensation reaction times from 15 minutes to 10 hours for the PzPs functional precursor silane.

PzPs was homo-polymerized using the following materials:
  4.45 ml (20.1 mmol), PzPs precursor;
  3.5 ml (60.3 mmol), ethanol; and
  1.085 ml (60.3 mmol) of 0.185 M HCl solution.

The molar ratio of PzPs:ethanol:water:HCl was 1:3:3:0.01 Homo-polymerization was carried out at room temperature.

While homo-condensing the PzPs, TEOS was also self-condensed at room temperature for 15 minutes by reacting:
  9.0 ml (40.2 mmol), TEOS;
  9.4 ml (160.8 mmol), ethanol, and
  2.92 ml (160.8 mmol) of 0.185 M HCl solution.

The molar ratio of TEOS:ethanol:water:HCl was 1:4:4:0.027 and the molar ratio PzPs:TEOS was 1:2. After self-condensation of both silanes, the solutions were mixed and co-condensed for 1-5 minutes and a desired amount of triethylamine at a ratio of [TEA]/[Si]$_t$=0.06 was added to induce gelation.

The synthesized materials were crushed, washed, and stored as described in Example 1.

A palladium chloride uptake experiment was performed to show the effect of PzPs precursor hydrolysis and homo-condensation time on the metal uptake capacity of the adsorbent. In the experiment, each 100 ml of 770 mg/L palladium chloride solution at 2 M HCl concentration is equilibrated with each 0.25 gram of adsorbent at 24° C. for 24 hours. The palladium uptake capacity ranged from 147 mg/g to 153 mg/g for homo-polymerization time of PzPs from 15 minutes to 3 hours with a maximum value occurring at 15 minutes.

Example 21

Palladium Chloride Uptake

An organo-ceramic composite material containing the PzPs functional moiety was synthesized according to Synthesis Scheme 1.

PzPs precursor was homo-polymerized using the following materials:
  4.45 ml (20.1 mmol), PzPs precursor;
  3.5 ml (60.3 mmol), ethanol; and
  1.085 ml (60.3 mmol) of 0.15 M HCl solution.

The molar ratio of PzPs:ethanol:water:HCl was 1:3:3:0.01. Homo-polymerization was carried out at room temperature for 3 hours.

While homo-condensing the PzPs, TEOS was also homo-condensed at room temperature for 3 hours by reacting:
  9.0 ml (40.2 mmol), TEOS;
  9.4 ml (160.8 mmol), ethanol, and
  2.92 ml (160.8 mmol) of 0.15 M HCl solution.

The molar ratio of TEOS:ethanol:water:HCl was 1:4:4:0.027 and the molar ratio PzPs:TEOS was 1:2. After homo-condensations of both silanes, the solutions are mixed and co-condensed for 1-5 minutes and a desired amount of triethylamine at a ratio of [TEA]/[Si]$_t$=0.06 was added to induce gelation.

The synthesized materials were crushed, washed, and stored as described in Example 1.

Figure 15:
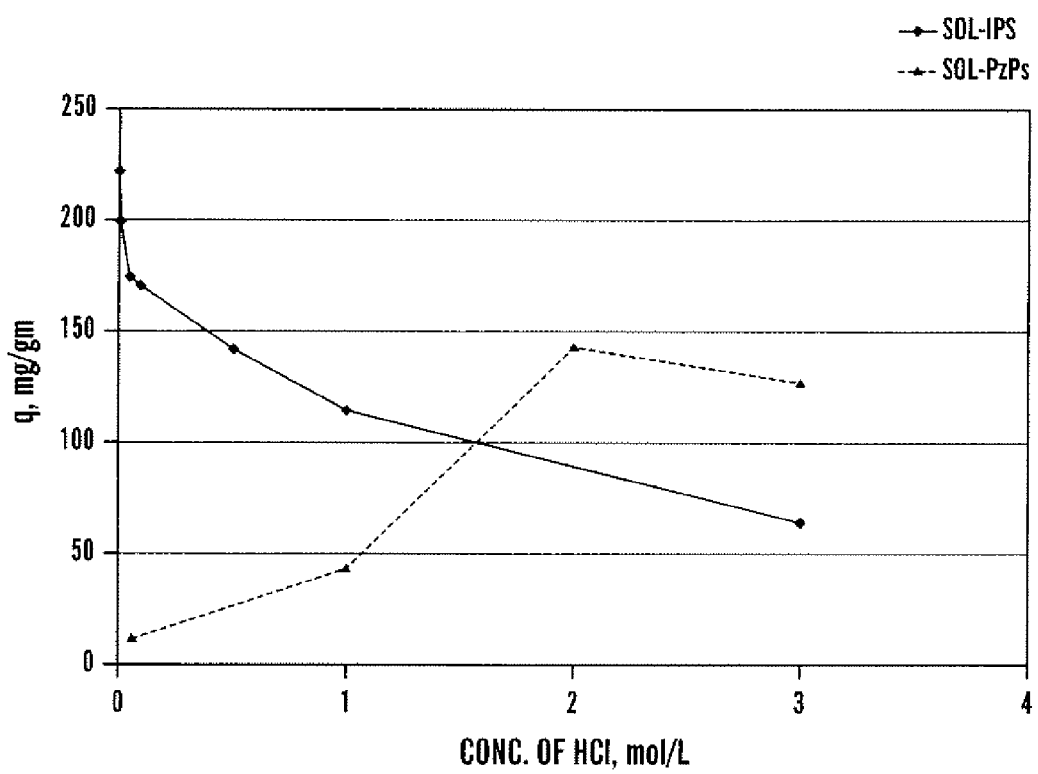
FIG. 15 is a comparison of palladium uptake capacities for a composite material containing an imidazole functional moiety and a composite material containing a pyrazole functional moiety, as measured at various HCl concentrations.

This organo-ceramic composite adsorbent can adsorb palladium chloride at very acidic conditions such as [HCl]>1 M. As shown in FIG. 15, the maximum palladium uptake of this adsorbent occurs at [HCl]=2.0 M. It was reported that a modified pyrazole solvent extractant does not extract copper and iron at that HCl concentration (du Preez et al., "Nitrogen Reagents in Metal Ion Separation, Part X: The Separation of Palladium From Platinum in Hydrochloric Acid Solution by Pyrazole Derivatives, Solvent Extraction and Ion Exchange", Solvent Extraction and Ion Exchange Pyrazole Derivatives 17, 317-332 (1999), which is hereby incorporated by reference), and it is expected that this adsorbent will have good selectivity for palladium over these common metals at these conditions.

Also shown on FIG. 15 is the palladium uptake using the adsorbent of Example 16. At concentrations of HCl less than 1.5 mmol/L, this adsorbent exceeds the capacity for palladium of the adsorbent in the present example. Therefore, a combination of these two adsorbents can provide a high capacity adsorbent to separate palladium and presumably other noble metals for HCl concentrations from 0 as high as 5.0 mol/L (by extrapolation).

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A method of removing a metal ion from a water Stream comprising:

(i) providing a copolymer of formula (I)

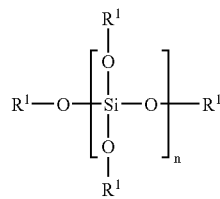

(I)

wherein $R^1$ is independently H, an alkyl group having from 1 to 5 carbon atoms,

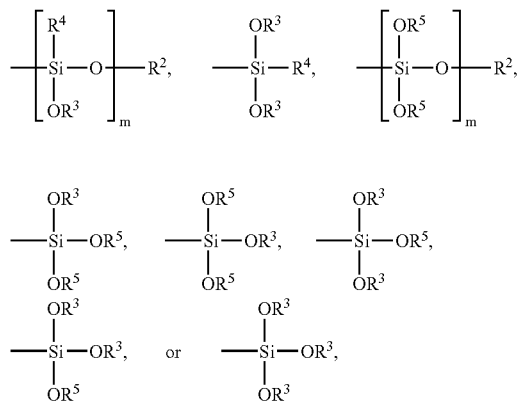

$R^2$ is independently H or an alkyl group having from 1 to 5 carbon atoms, $R^3$ is independently $R^2$,

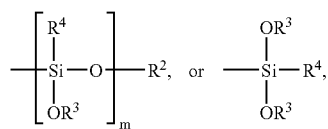

$R^4$ is a functional group with metal ion adsorption activity that has the structure

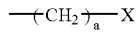

wherein a is an integer from 1 to 5 and X is

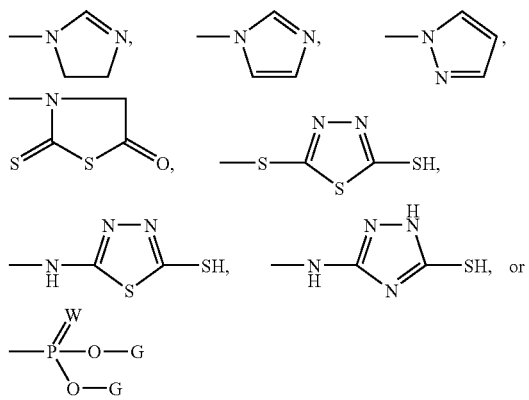

with W being sulfur or oxygen, and G being hydrogen or an alkyl group having from 1 to 5 carbon atoms, or the structure

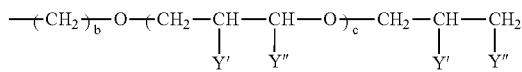

wherein b is an integer from 0 to 5, c is an integer from 1 to 5, and Y' and Y" are different and each is $NH_2$ or OH, $R^5$ is independently $R^2$ or

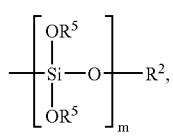

n is an integer greater than 10 and m is an integer greater than 1, and wherein the copolymer is characterized by clustering of the functional groups having adsorption activity as dimers, trimers, or higher oligomers integrated into the copolymer; and (ii) contacting a water stream containing a metal ion with the copolymer under conditions effective to remove the metal ion from the water stream.

2. The method according to claim 1, wherein the metal ion is selected from the group of heavy metal ions, rare earth metal ions, platinum group metal ions, and noble metal ions.

3. The method according to claim 2, wherein the metal ion is a rare earth metal ion selected from the group of cerium, neodymium, and praseodymium.

4. The method according to claim 2, wherein the metal ion is a noble metal ion selected from the group of silver and gold.

5. The method according to claim 2, wherein the metal ion is a platinum group metal ion selected from the group of palladium, platinum, rhodium, ruthenium, osmium, iridium.

6. The method according to claim 2, wherein metal ion is a heavy metal ion selected from the group of antimony, arsenic, beryllium, cadmium, chromium, copper, lead, mercury, selenium, thallium, tin, zinc, molybdenum, cobalt, technetium, rhenium, cesium, and strontium.

7. The method according to claim 1, wherein the water stream comprises two or more metal ions and said contacting is carried out under conditions effective to remove the two or more metal ions from the water stream.

8. The method according to claim 7, wherein said contacting is carried out under conditions effective to remove the two or more metal ions from the water stream exclusive of another metal ion in the water stream.

9. The method according to claim 8, wherein the two or more metal ions are noble metal ions or platinum group metal ions.

10. The method according to claim 9, wherein the functional group is

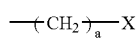

wherein a is an integer from 1 to 5 and
X is either

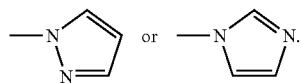

11. The method according to claim 1, wherein the functional group is

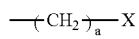

wherein a is an integer from 1 to 5 and
X is

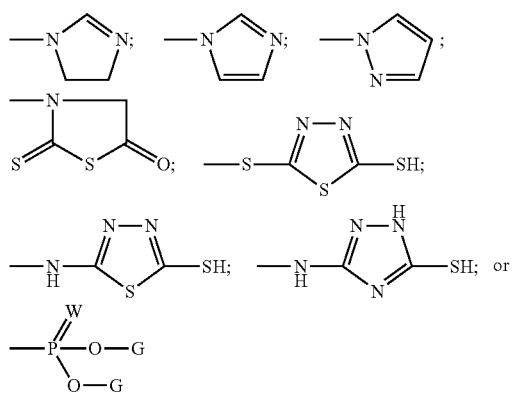

with W being sulfur or oxygen, and G being hydrogen or an alkyl group having from 1 to 5 carbon atoms.

12. The method according to claim 1, wherein the copolymer comprises a plurality of pores having an average pore size of about 5 Å to about 200 Å.

13. The method according to claim 1, wherein the copolymer has a functional group density of about 0.1 mmol/g to about 10 mmol/g.

14. The method according to claim 1, wherein the copolymer is present in the form of a plurality of granules having an average particle diameter of about 10 μm to about 500 μm.

15. The method according to claim 1, further comprising:
introducing the copolymer into a packed bed or a fluidized bed, wherein said contacting occurs in the packed bed or the fluidized bed.

16. The method according to claim 1, wherein the functional group is

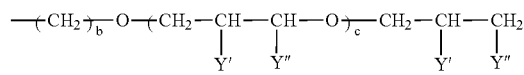

wherein b is an integer from 0 to 5, c is an integer from 1 to 5, and Y' and Y" are different and each is $NH_2$ or OH.

17. A method of recovering a metal ion from a water stream comprising:
(i) providing a copolymer of formula (I)

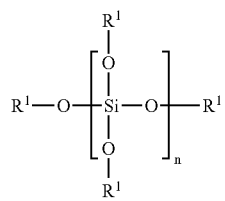

(I)

wherein $R^1$ is independently H, an alkyl group having from 1 to 5 carbon atoms,

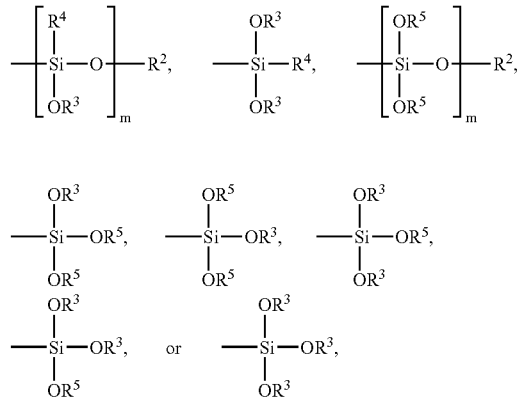

$R^2$ is independently H or an alkyl group having from 1 to 5 carbon atoms, $R^3$ is independently $R^2$,

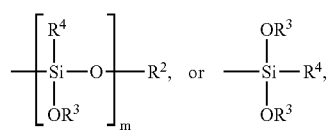

$R^4$ is a functional group with metal ion adsorption activity that has the structure

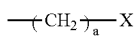

wherein a is an integer from 1 to 5 and X is

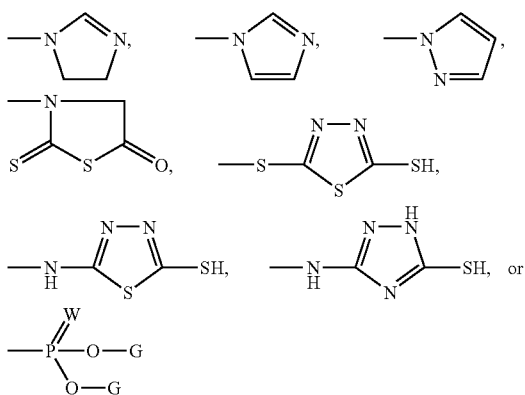

with W being sulfur or oxygen, and G being hydrogen or an alkyl group having from 1 to 5 carbon atoms,
or the structure

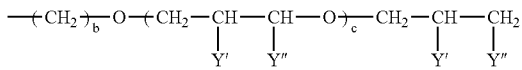

wherein b is an integer from 0 to 5, c is an integer from 1 to 5, and Y' and Y" are different and each is $NH_2$ or OH,
$R^5$ independently $R^2$ or

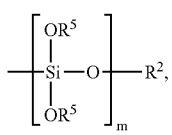

n is an integer greater than 10 and m is an integer greater than 1, and
wherein the copolymer is characterized by clustering of the functional groups having adsorption activity as dimers, trimers, or higher oligomers integrated into copolymer;
(ii) contacting a water stream containing a metal ion with the copolymer under conditions effective for the copolymer to adsorb the metal ion from the water stream;
(iii) stripping the adsorbed metal ion from the copolymer under conditions effective to yield a concentrate of the metal ion; and
(iv) recovering the metal ion from the concentrate.

18. The method according to claim 17, wherein the metal ion is selected from the group of heavy metal ions, rare earth metal ions, platinum group metal ions, and noble metal ions.

19. The method according to claim 18, wherein the metal ion is a rare earth metal ion selected from the group of cerium, neodymium, and praseodymium.

20. The method according to claim 18, wherein the metal ion is a noble metal ion selected from the group of silver and gold.

21. The method according to claim 18, wherein the metal ion is a platinum group metal ion selected from the group of palladium, platinum, rhodium, ruthenium, osmium, iridium.

22. The method according to claim 18, wherein the metal ion is a heavy metal ion selected from the group of antimony, arsenic, beryllium, cadmium, chromium, copper, lead, mercury, selenium, thallium, tin, zinc, molybdenum, cobalt, technetium, rhenium, cesium, and strontium.

23. The method according to claim 17, wherein the water stream comprises two or more metal ions and said contacting is carried out under conditions effective to remove the two or more metal ions from the water stream.

24. The method according to claim 23, wherein said contacting is carried out under conditions effective to remove the two or more metal ions from the water stream exclusive of another metal ion in the water stream.

25. The method according to claim 24, wherein the two or more metal ions are noble metal ions or platinum group metal ions.

26. The method according to claim 25, wherein the functional group is

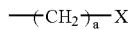

wherein a is an integer from 1 to 5 and
X is either

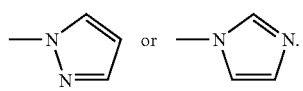

27. The method according to claim 17, wherein the functional group is

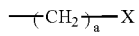

wherein a is an integer from 1 to 5 and
X is

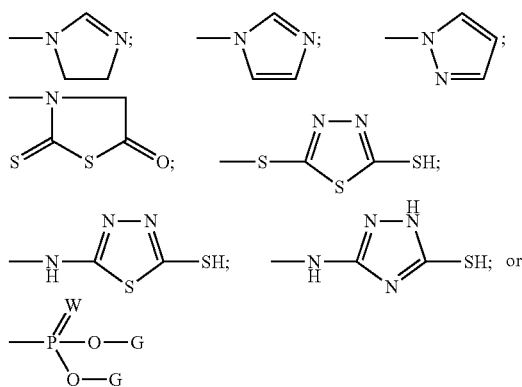

with W being sulfur or oxygen, and G being hydrogen or an alkyl group having from 1 to 5 carbon atoms.

28. The method according to claim 17, wherein the copolymer comprises a plurality of pores having an average pore size of about 5 Å to about 200 Å.

29. The method according to claim 17, wherein the copolymer has a functional group density of about 0.1 mmol/g to about 10 mmol/g.

30. The method according to claim 17, wherein the copolymer is present in the form of a plurality of granules having an average particle diameter of about 10 μm to about 500 μm.

31. The method according to claim 17, further comprising:

introducing the copolymer into a packed bed or a fluidized bed, wherein said contacting occurs in the packed bed or the fluidized bed.

32. The method according to claim 17, wherein said stripping comprises passing a stripping agent over the copolymer.

33. The method according to claim 17, wherein said recovering comprises subjecting the concentrate to electrolysis under conditions effective to recover the metal ion.

34. The method according to claim 17, wherein said recovering comprises precipitating from the concentrate an insoluble or weakly soluble salt of the metal.

35. The method according to claim 17, wherein the functional group is

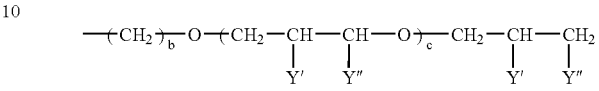

wherein b is an integer from 0 to 5, c is an integer from 1 to 5, and Y' and Y" are different and each is $NH_2$ or OH.

* * * * *